United States Patent
Honkura et al.

(10) Patent No.: US 7,420,364 B2
(45) Date of Patent: Sep. 2, 2008

(54) SMALL-SIZED ATTITUDE DETECTION SENSOR AND PORTABLE TELEPHONE USING THE SMALL-SIZED ATTITUDE DETECTION SENSOR

(75) Inventors: Yoshinobu Honkura, Tokai (JP); Michiharu Yamamoto, Tokai (JP); Yoshiaki Kohtani, Tokai (JP); Masaki Mori, Tokai (JP); Eiji Kako, Tokai (JP); Tomohiko Nagao, Tokai (JP); Toshiro Matsumura, Tokyo (JP); Hirohisa Kusuda, Tokyo (JP); Yasuhiro Nishide, Tokyo (JP); Daisuke Tsujino, Tokyo (JP); Jun Yamazaki, Tokyo (JP); Takashi Katayama, Hyogo (JP)

(73) Assignees: Aichi Steel Corporation, Tokai-shi (JP); Vodafone K.K., Tokyo (JP)

( * ) Notice: Subject to any disclaimer, the term of this patent is extended or adjusted under 35 U.S.C. 154(b) by 243 days.

(21) Appl. No.: 10/556,093

(22) PCT Filed: May 17, 2005

(86) PCT No.: PCT/JP2005/008941

§ 371 (c)(1),
(2), (4) Date: Nov. 9, 2005

(87) PCT Pub. No.: WO2005/111542

PCT Pub. Date: Nov. 24, 2005

(65) Prior Publication Data

US 2007/0069721 A1 Mar. 29, 2007

(30) Foreign Application Priority Data

May 17, 2004 (JP) ............................. 2004-146831

(51) Int. Cl.
G01R 33/02 (2006.01)
G01R 33/00 (2006.01)
G01P 15/00 (2006.01)
G01P 15/11 (2006.01)

(52) U.S. Cl. ...................... 324/247; 324/244; 324/260; 73/514.16; 73/514.31

(58) Field of Classification Search ................. 324/244, 324/247, 249, 245, 251, 252, 260, 253; 73/514.31, 73/514.35, 514.01, 514.02, 514.16; 257/427
See application file for complete search history.

(56) References Cited

U.S. PATENT DOCUMENTS

| 2004/0090229 A1 | 5/2004 | Kimura |
| 2006/0123906 A1* | 6/2006 | Honkura et al. .......... 73/514.16 |
| 2007/0068252 A1* | 3/2007 | Honkura et al. .......... 73/514.16 |

FOREIGN PATENT DOCUMENTS

| JP | 2000-258449 | 9/2000 |
| JP | 2003-172633 | 6/2003 |
| WO | 2005/039154 | 4/2005 |
| WO | 2005/039155 | 4/2005 |

OTHER PUBLICATIONS

U.S. Appl. No. 10/556,093, filed Nov. 9, 2005, Honkura et al.

* cited by examiner

*Primary Examiner*—Patrick Assouad
*Assistant Examiner*—David M. Schindler
(74) *Attorney, Agent, or Firm*—Oblon, Spivak, McClelland, Maier & Neustadt, P.C.

(57) ABSTRACT

An attitude detection sensor includes three magnetic sensing parts that detect magnetic field strength in respective directions along three axes perpendicular to each other, and two tilt sensing parts that detect tilt angles around two axes perpendicular to each other. The tilt sensing parts each include a cantilever having a magnet body that moves in accordance with the tilt angle, and a magnetic detection head that detects a displacement of the magnet body. The three magnetic sensing parts and the two magnetic detection heads are each formed using a magnetic detection element of the same type. At least one electronic circuit for controlling the five magnetic detection elements, the three magnetic sensing parts, and the two tilt sensing parts is disposed in a single package in the form of a module.

8 Claims, 22 Drawing Sheets

(a) pulse current (b) voltage of detection coil e

FIG. 9
(a)
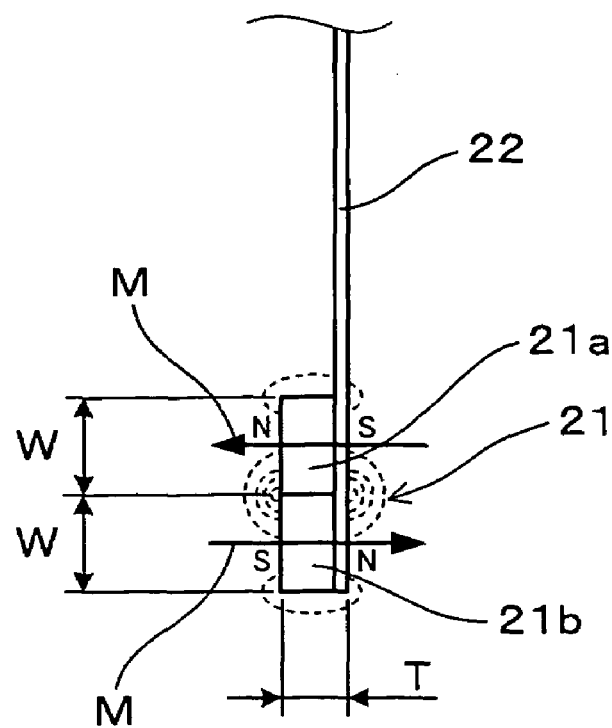
(b)
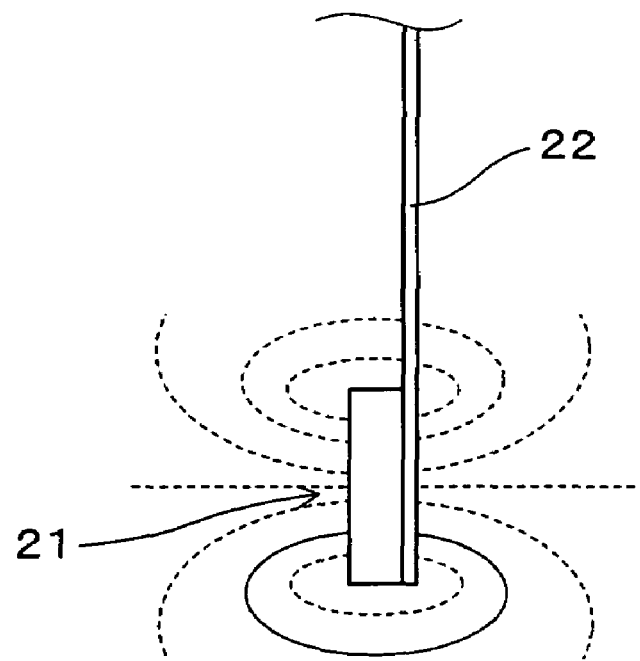

SMALL-SIZED ATTITUDE DETECTION SENSOR AND PORTABLE TELEPHONE USING THE SMALL-SIZED ATTITUDE DETECTION SENSOR

TECHNICAL FIELD

The present invention relates to a small-sized attitude detection sensor for detecting a bearing and a tilt and to a portable telephone using such a small-sized attitude detection sensor.

BACKGROUND ART

An attitude detection sensor for detecting a bearing and a tilt is known, which is composed of a combination of a 3-axis magnetic sensing part and a 2- or more axis acceleration sensing part. More specifically, a magnetic sensing part using a Hall device and an acceleration sensing part including a stress sensing element for detecting displacement of a weight which moves depending on a gravitational force applied to the weight (as disclosed, for example, in Patent Document 1).

Patent Document 1: Japanese Unexamined Patent Application Publication No. 2003-172633

However, the conventional attitude detection sensor has the following problems. In this attitude detection sensor, because the magnetic sensing part and the acceleration sensing part are based on different measurement principles, it is difficult to achieve an efficient disposition of these sensors, and thus it is difficult to achieve miniaturization of total size of an attitude detection sensor. Besides, the magnetic sensing part and the acceleration sensing part need completely different electronic circuits for processing signals output from these sensors. The necessity for two different types of electronic circuits also makes it difficult for the attitude detection sensor to have a sufficiently small size.

DISCLOSURE OF INVENTION

Problems to be Solved by the Invention

In view of the problems described above, the present invention provides a small-sized attitude detection sensor capable of detecting both a bearing and a tilt.

Means for Solving the Problems

A small-sized attitude detection sensor in a first aspect includes three magnetic sensing parts that detect magnetic field strength in respective directions along three axes perpendicular to each other;

and two tilt sensing parts that detect tilt angles around two axes perpendicular to each other;

wherein each tilt sensing part includes a cantilever having a magnet body that moves in accordance with the tilt angle, and a magnetic detection head that detects a displacement of the magnet body, the three magnetic sensing parts and the two magnetic detection heads are each formed using a magnetic detection element of the same type, and at least one electronic circuit for controlling the five magnetic detection elements, the three magnetic sensing parts, and the two tilt sensing parts are disposed in a single package in the form of a module.

In this small-sized attitude detection sensor according to the first aspect, as described above, the three magnetic sensing parts that detect magnetic field strength in respective directions along three axes perpendicular to each other, the two tilt sensing parts that detect respective tilt angles around two axes perpendicular to each other, and the electronic circuit that controls the magnetic sensing parts and the magnetic head of the tilt sensing parts are disposed in the single package in the form of the module.

The two tilt sensing parts are capable of detecting the tilt angle of a plane defined by the two axes perpendicular to each other. The three magnetic sensing parts allow a detection of a rotation angle which turn-in-place regardless of the tilt angle. Thus, the combination of a set of the two tilt sensing parts and a set of the three magnetic sensing parts makes it possible to detect the bearing and the tilt angle of the small-sized attitude detection sensor.

In this small-sized attitude detection sensor, because the three magnetic sensing parts and the two tilt sensing parts are placed into the module, the small-sized attitude detection sensor has a smaller size and can control with smaller power consumption than a size and power consumption needed when the tilt sensing parts and the magnetic sensing parts are in the form of separate parts.

The modularized small-sized attitude detection sensor is capable of maintaining high accuracy in terms of relative positions of axes of the magnetic sensing parts and the tilt sensing parts. This allows a further improvement in detection accuracy of the bearing and the tilt angle.

The three magnetic sensing parts and the two magnetic detection heads are each formed using a magnetic detection element of the same type. This allows the electronic circuits to drive the magnetic detection elements according to the same principle, and thus it becomes possible to easily achieve simplification and miniaturization of the small-sized attitude detection sensor.

As described above, the small-sized attitude detection sensor in the first aspect of the present invention has high performance in terms of the small size, the high axial accuracy, and the low power consumption.

A portable telephone in a second aspect includes a magnetic detection sensor for detecting attitude information, a central processing unit, and a memory element for storing an operation program, wherein the small-sized attitude detection sensor in the first aspect is used as the magnetic detection sensor, and the central processing unit is configured to download a signal output from each magnetic detection sensor and performs a predetermined operation in accordance with the operation program.

The portable telephone according to the second aspect of the present invention is capable of accurately detecting the bearing and the tilt angle of the portable telephone by using the small-sized attitude detection sensor disposed in the portable telephone. The central processing unit in the portable telephone acquires signal output of the magnetic detection sensors, that is, the information such as the attitude and the bearing or the like of the portable telephone and performs the predetermined operation in accordance with the operation program.

A specific example of the predetermined operation is scrolling of a screen in a particular direction in accordance with the attitude information. Another example is moving of a cursor in a particular direction in accordance with the attitude information. A still another example of the predetermined operation is to start or end a telephone call or open a received mail, when a particular change occurs in the attitude, for example, when the portable telephone is rotated or shaken.

Composing the portable telephone to perform a particular operation depending on a signal output of the small-sized attitude detection sensor, the attitude information can be used as input information of the portable telephone without using keys or input information of the portable telephone concerting key operation.

Further, as the above particular operation, for example, the output signal of the small-sized attitude detection sensor is stored in the memory element such as a RAM or a ROM. In this case, based on the time-dependent change of the output signal stored in the memory element, it is possible to realize the motion of a user of the portable telephone.

BRIEF DESCRIPTION OF THE DRAWINGS

FIG. 9 is a top view showing a magnet body and associated parts in a tilt sensing part in Example 1.

BEST MODE FOR CARRYING OUT THE INVENTION

Figure 1:
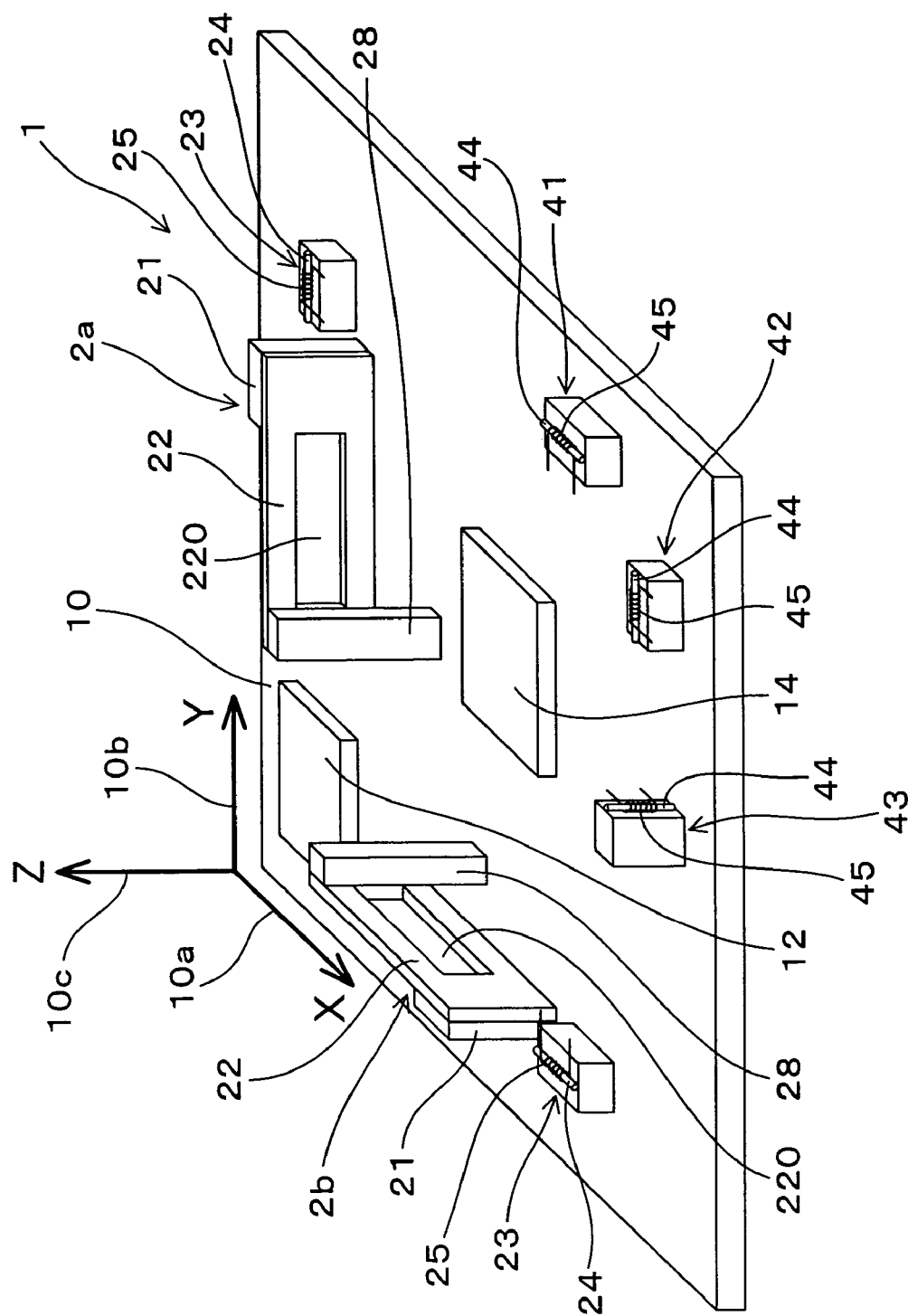
FIG. 1 is a perspective view of a small-sized attitude detection sensor in Example 1.

The small-sized attitude detection sensor according to the first aspect of the present invention is applicable for controlling a portable device such as a portable telephone and also other various devices such as a car, an autonomous mobile robot, a manipulator of a robot, etc.

It is preferable that the magnetic detection elements used to form the three respective magnetic sensing parts and the magnetic detection elements used to form the two respective magnetic detection heads are each formed using a magneto-impedance (MI) sensor element.

It is preferable that each of the magnetic sensing parts and the magnetic detection heads be composed of an MI element including a magneto-sensitive element and an electro-magnetic coil wound around the magneto-sensitive element, and being configured to generate an electric potential difference between two ends of the electro-magnetic coil depending on a change in a current flowing through the magneto-sensitive element.

It is preferable that each of the cantilever is in the form of a strip beam, one end of which is fixed to a substrate of the package via a supporting post, and the magnet body is disposed on the other end of which, the cantilever is rotatable in a direction normal to a main plane of the cantilever, and the cantilever is disposed such that the direction of the rotation is parallel with the surface of the substrate.

Note that "rotation" means that the cantilever bends such that the free end (on which the magnet body is disposed) of the cantilever is displaced and thus a corresponding change in angle occurs. The amount of bending of the cantilever and the corresponding displacement of the free end thereof are small. For example, the displacement of the free end of the cantilever is as small as about one-tenth of or less than the length of the cantilever.

The effect that a voltage depending on a change in a current flowing through a magneto-sensitive element is induced in an electro-magnetic coil is called a magneto-impedance (MI) effect. The MI effect can occur in a magneto-sensitive element composed of a magnetic material in which electron spins are aligned in a rotational direction around a direction that a supplied current flows. If the current flowing through the magneto-sensitive element is changed abruptly, an abrupt change in the magnetic field in the rotational direction occurs, which causes a change in the electron spin direction depending on an ambient magnetic field. The effect of a change in internal magnetization and a change in impedance or the like occurred in the magneto-sensitive element at that time is the above MI effect.

The operation of the MI element is based on the effect of the magneto-sensitive element composed of the magnetic material in which electron spins are aligned in the rotational direction around the direction in which the supplied current flows. If the current flowing through the magneto-sensitive element is changed abruptly, an abrupt change in the magnetic field in the rotational direction occurs, which causes a change in the electron spin direction depending on an ambient magnetic field. The change in the internal magnetization or the impedance of the magneto-sensitive element is converted into a voltage generated across the magneto-sensitive element itself or generated between two ends of a magneto coil wound around the magneto-sensitive element or is converted into a current flowing through the magneto-sensitive element itself or flowing through the magneto coil wound around the magneto-sensitive element. A sensor produced by combining an MI element and an electronic circuit is called an MI sensor.

In the case the magnetic sensing part or the magnetic detection head is obtained by using the MI element that generates an electric potential difference between two ends of the electro-magnetic coil depending the change in the current flowing through the magneto-sensitive element, a high-sensitivity magnetic detection can be available and displacement of the magnet body can be detected with high accuracy. The magneto-sensitive element may be in the form of a wire or a thin film. Specific examples of materials of the magneto-sensitive element include FeCoSiB and NiFe.

Each magnetic sensing part using an MI element is capable of detecting magnetic field strength in a direction along each axis with high accuracy. The magnetic detection head using an MI element in each tilt sensing part is capable of accurately detecting the tilt angle of the package substrate, that is, the rotation angle around the axis in the longitudinal direction of the cantilever.

It is preferable that the magnet body is composed of a first magnet body magnetized in one direction and a second magnet body magnetized in an opposite direction.

In this case, the first magnet body and the second magnet body have opposite magnetic moments in direction. Therefore, when an ambient magnetic field is applied to the first and second magnet bodies having opposite magnet moments, torques act on the first and second magnet bodies in opposite directions. The torque acting on the first magnet body tries to move the cantilever in one direction, while the torque acting on the second magnet body tries to move the cantilever in the opposite direction, and thus torques are cancelled out. As a result, the displacement of the magnet body and the displacement of the cantilever due to the ambient magnetic field are suppressed.

It is preferable that each of the magnetic sensing parts and the magnetic detection heads is configured to be able to detect magnetic field strength by detecting an induced voltage generated between two ends of the electro-magnetic coil thereof when the current flowing through the magneto-sensitive element rises up or falls down at a rate equal to or less than 10 nsec.

Such an abrupt change in the flowing current causes the magnetic field in the rotational direction around the magneto-sensitive element to change at a high rate corresponding to a velocity at which the change in the electron spin propagates, and thus a sufficiently high MI effect can be obtained.

When the flowing current is risen or fallen at a rate equal to or less than 10 nsec, the magneto-sensitive element receives a current change of flow including a high-frequency component of about 0.1 GHz. By detecting the voltage induced at both ends of the electro-magnetic coil, it is possible to detect a change in internal magnetization depending on an ambient magnetic field as the size of the induced voltage, and thus it is possible to detect the strength of the ambient magnetic field with very high accuracy. The rising or the falling of the flowing current is defined by changing the current flowing through the MI element from 10% to 90% or from 90% to 10% of the steady-state current, for example.

It is preferable that the magnetic detection head detect a voltage induced between both ends of the electro-magnetic coil when the current flowing through the magneto-sensitive element falls down.

Better linearity concerning the magnetic field strength vs. output signal of the magnetic detection head is obtained in the case in which the induced voltage is detected when the flowing current falls down abruptly than in the case in which the induced voltage is detected when the flowing current rises up.

It is preferable that the substrate includes at least a first substrate on which a vertical magnetic sensing part for detecting the magnetic field strength in a direction perpendicular to the surface of the substrate, and a second substrate held on the first substrate, and the vertical magnetic sensing part be disposed, in parallel to the second substrate, on a surface of the first substrate.

On the mounting surface of the first substrate, disposing the vertical magnetic sensing part in parallel to the second substrate means that the vertical magnetic sensing part is disposed on an area where the mounting height is not restricted by the second substrate.

By mounting the vertical magnetic sensing part with a large height in parallel to the second substrate on the mounting surface of the first substrate, it becomes possible to make full use of space in the vertical direction of the small-sized attitude detection sensor. Thus, the small-sized attitude detection sensor is constructed in a form in which parts are disposed very densely.

It is preferable that the small-sized attitude detection sensor further includes stoppers for preventing over-displacement of each free end of each cantilever in a rotational direction.

In this structure, when a large shock is applied to the small-sized attitude detection sensor and thus a large force is applied to the cantilever, the free end of the cantilever is contacted with the stopper, and thus excessive displacement of the cantilever is prevented. This prevents the cantilever from being deformed or damaged.

Only a single stopper may be disposed on one side of the cantilever, at a position which is close to the free end of the cantilever and toward which the cantilever is rotatable, or two stoppers may be disposed on both sides of the cantilever.

It is preferable that at least one of the stoppers is integrated with the supporting post.

This allows the small-sized attitude detection sensor to be produced easily with a less number of parts at a lower cost.

In the small-sized attitude detection sensor, it is preferable that two electronic circuits each having a change-over switch are used in a time-sharing manner to control the five magnetic detection elements.

Thus, it is preferable that the electronic circuit include a first electronic circuit that controls the magnetic sensing parts and a second electronic circuit that controls the tilt sensing parts, the first electronic circuit controlling the three magnetic sensing parts with time-sharing, and the second electronic circuit controlling the two tilt sensing parts with time-sharing.

Note that the "controlling by time-sharing" refers to a magnetic sensing part or a tilt sensing part is controlled by sequential switching at predetermined time intervals.

In this case, because the first electronic circuit is shared by the three magnetic sensing parts, and the second electronic circuit is shared by the two tilt sensing parts, and thus a reduction in the total size of the small-sized attitude detection sensor and a reduction in power consumption are achieved. This allows an improvement in mountability of the small-sized attitude detection sensor on an electronic circuit board.

It is preferable that the electronic circuit is configured to control the three magnetic sensing parts and the two tilt sensing parts with time-sharing.

In this case, because the electronic circuit controls MI elements of all magnetic sensing parts and tilt sensing parts by means of time-sharing, a further reduction in the size and simplification of the electronic circuit can be achieved.

It is more preferable that an electronic circuit having a change-over switch is used in a time-sharing manner to control the five magnetic detection elements.

In this configuration, because one electronic circuit is shared by the three magnetic sensing parts and the two tilt sensing parts, a further reduction in the total size of the attitude detection sensor can be easily achieved, and a reduction in power consumption is also achieved.

It is preferable that the electronic circuit corrects a measurement signal output from each magnet detection head by using at least one of the measurement signals output from the three magnetic sensing parts.

More specifically, in the electronic circuit, the measurement signal (output) of the magnet detection head is preferably corrected by using the measurement signal of the magnet sensor whose direction is the same as the direction (sensitive direction) of the magnet detection head.

By using the detection signal output from the magnetic sensing part, it becomes possible to eliminate an influence of an ambient magnetic field such as geomagnetism on the detection signal of the tilt sensing part, and thus it becomes possible to greatly improve the measurement accuracy.

More specifically, it is preferable that the small-sized attitude detection sensor has a function of making a correction by subtracting the value of a magnetic field measured by a magnetic sensing part disposed in parallel with a magnetic detection head of each tilt sensing part from the value of a magnetic field measured by the magnetic detection head of each tilt sensing part.

More specifically, for example, two of the three magnetic sensing parts are disposed so as to be in parallel with the magnetic detection heads of the two respective tilt sensing parts, and corrections are made by subtracting values of magnetic fields measured by the magnetic sensing parts from the values measured by respective corresponding parallel magnetic detection heads. This makes it possible to make a correct measurement without being influenced by an ambient magnetic field.

It is preferable that the small-sized attitude detection sensor is in the form of a surface mount chip.

This allows a further improvement in mountability of the small-sized attitude detection sensor on an electronic circuit board or the like.

It is preferable that the small-sized attitude detection sensor is in the form of a small-sized surface-mounting chip with a width equal to or less than 6 mm, a depth equal to or less than 6 mm, and a height equal to or less than 2 mm. This allows a further reduction in the size of the small-sized attitude detection sensor, which results in a further improvement in mountability on an electronic board or the like.

EXAMPLES

Example 1

In Example 1, the invention is applied to a small-sized and low-power attitude detection sensor. The details of Example 1 are described below with reference to FIGS. 1 to 13.

In this example, as shown in FIG. 1, the small-sized attitude detection sensor 1 includes three magnetic sensing parts 41, 42 and 43 that detect magnetic field strength in respective directions along three axes perpendicular to each other, and two tilt sensing parts 2a and 2b that detect a tilt angle around each of two axes perpendicular to each other.

The tilt sensing parts 2a and 2b each include a cantilever 22 having a magnet body 21 that moves in accordance with the tilt angle, and a magnetic detection head 23 that detects a displacement of the magnet body 21.

The three magnetic sensing parts 41, 42 and 43 and the two magnetic detection heads 23 are each formed using a magnetic detection element of the same type.

At least one electronic circuit for controlling the five magnetic detection elements, the three magnetic sensing parts 41, 42 and 43, and the two tilt sensing parts 2a and 2b are disposed in a single package in the form of a module.

The structure of the small-sized attitude detection sensor 1 is described in further detail below.

The magnetic sensing parts 41 to 43 of the small-sized attitude detection sensor 1 are disposed such that each of two magnetic sensing parts detects a magnetic field strength along each of two perpendicular sides of the substrate 10 having a rectangular shape and the remaining magnetic sensing part detects a magnetic field strength along an axis (the vertical line of the substrate 10) perpendicular to the former two axes. The tilt sensing parts 2a and 2b are disposed, as shown in FIG. 1, such that each tilt sensing part detects the tilt angle with respect to a corresponding one of two perpendicular axes along two sides of the substrate 10 having a rectangular shape. An IC chip 14 serving as an electronic circuit for controlling the magnetic sensing parts and an IC chip 12 serving as an electronic circuit for controlling the tilt sensing parts are disposed on the surface of substrate 10. In the following explanation, axes along two perpendicular sides of the substrate 10 are respectively referred to as an X axis 10a and a Y axis 10b, and the axis along the vertical line of the substrate 10 is referred to as a Z axis 10c.

Figure 2:
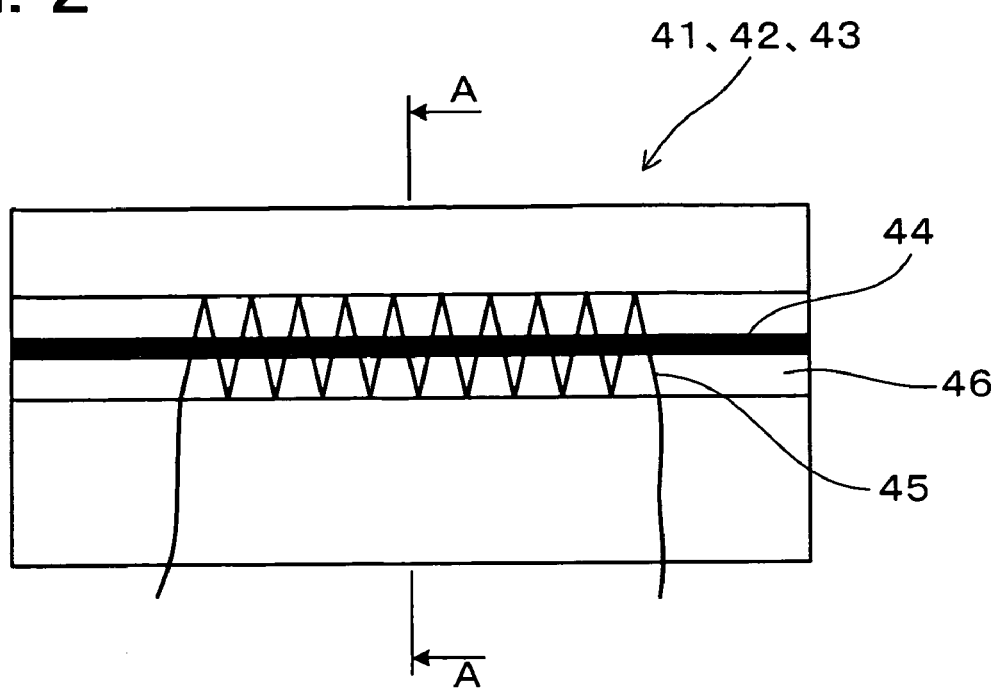
FIG. 2 is a front view of a magnetic sensing part in Example 1.
Figure 3:
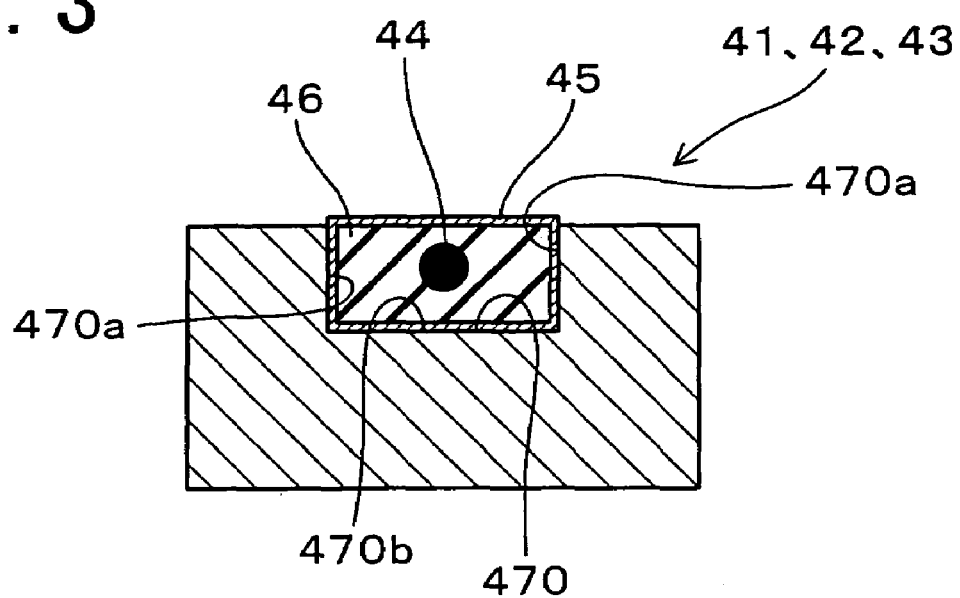
FIG. 3 is a cross-sectional view of cross-sectional structure of a magnetic sensing part in Example 1.

In each of the magnetic sensing parts 41 to 43, an amorphous wire formed of a $Co_{68.1}Fe_{4.4}Si_{12.5}B_{15.0}$ alloy and having a length of 1 mm and a diameter of 20 μm (hereinafter, referred to simply as an amorphous wire 44) is used as a magneto-sensitive element 44. Each of the magnetic sensing parts 41 to 43 is formed, as shown in FIGS. 2 and 3, such that an electro-magnetic coil 45 with an inner diameter equal to or less than 200 μm is wound around the periphery of an insulating resin tube 46 in which the amorphous wire 44 is inserted.

That is, the operation of magnetic sensing parts 41 to 43 is based on the MI (Magneto-impedance) effect of the amorphous wire 44 serving as the magneto-sensitive element whose impedance greatly varies depending on the strength of the ambient magnetic field in which the amorphous wire 44 is placed. This effect of the amorphous wire 44 is called magneto-impedance (MI) effect. In these magnetic sensing parts 41 to 43, the strength of the magnetic field is detected by detecting a voltage induced when a pulse current is passed through the amorphous wire 44.

MI elements (magnetic sensing parts 41 to 43 in the present invention) using the MI effect is composed of a change such as internal magnetization and impedance of the magneto-sensitive element resulting from a change in electron spin direction caused by an abrupt change in a current flowing through the amorphous wire 44 serving as the magneto-sensitive element being converted to a voltage (induced voltage) between the both ends of the electro-magnetic coil 45 wound around the amorphous wire 44. Each of magnetic sensing parts 41 to 43 of this example has a magnetic detection sensitivity in a longitudinal direction of the amorphous wire 44 serving as the magneto-sensitive element.

Figure 4:
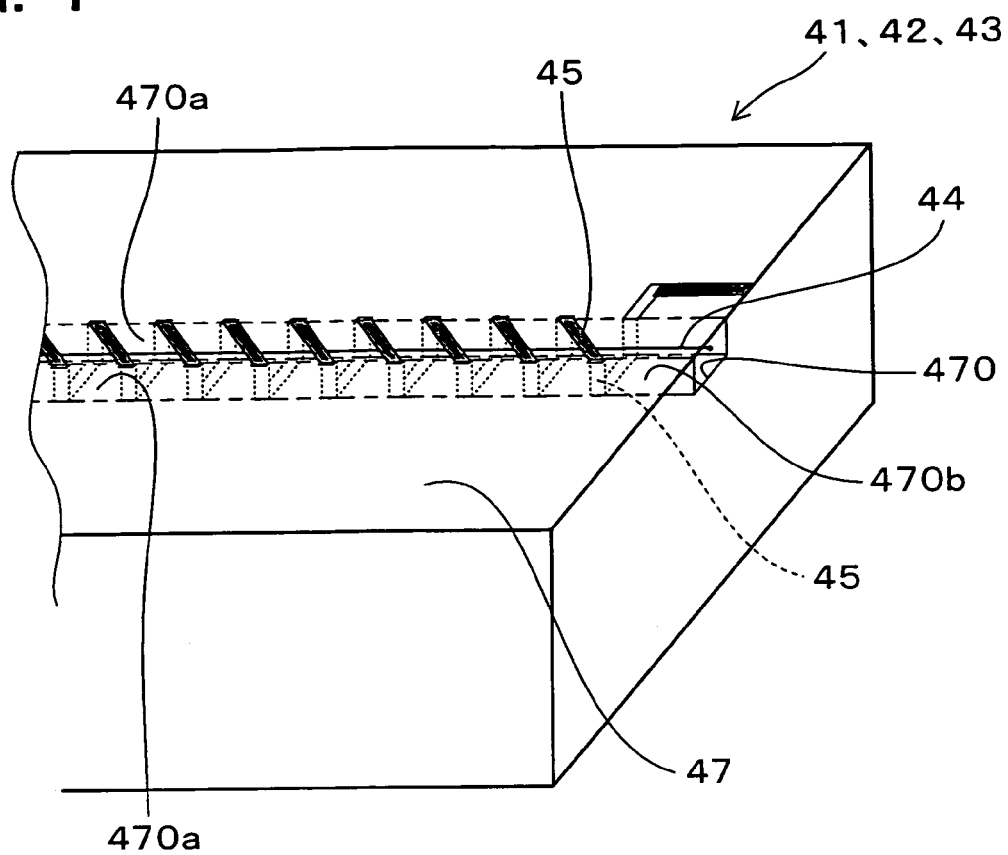
FIG. 4 is a perspective view for explaining a magnetic sensing part in Example 1.
Figure 5:
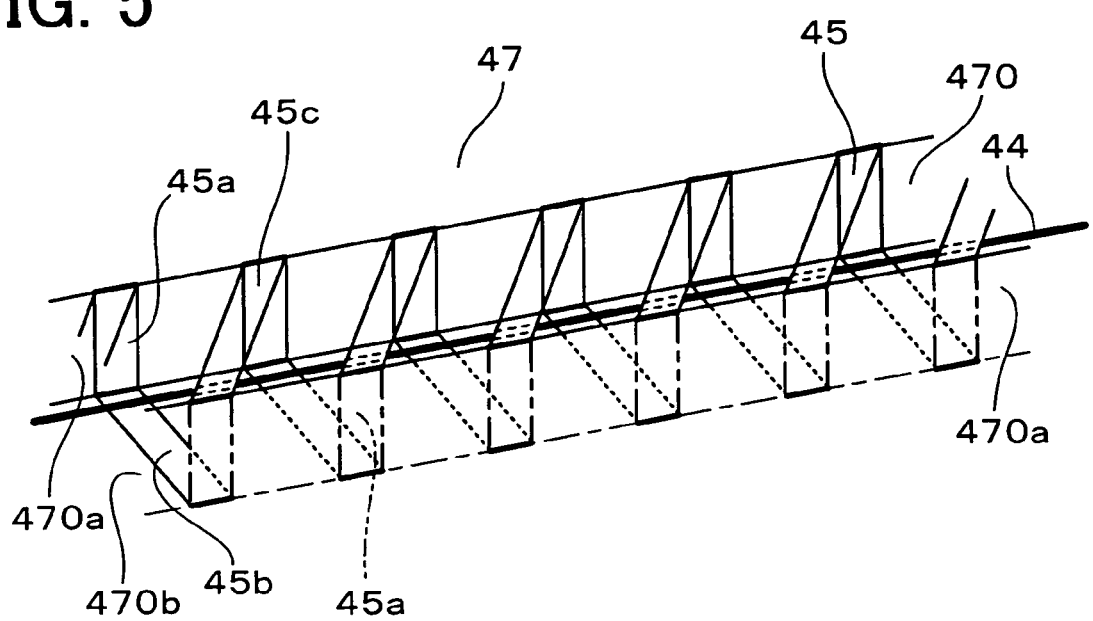
FIG. 5 is a perspective view for explaining an electromagnetic coil in Example 1.

As shown in FIGS. 4 and 5, each of magnetic sensing parts 41 to 43 is formed on an element substrate 47 having a groove-shaped recess 470 that is 5 to 200 μm in depth and rectangular in cross section. On each of side walls 470a facing each other in the inside of the recess 470, conductive patterns 45a each including a Cu base are formed at regular intervals in a direction perpendicular to the direction of the groove. On the bottom surface 470b of the recess 470, conductive patterns 45b electrically connecting to conductive patterns 45a which position are shifted by one interval on the opposing side wall 470a are formed diagonally in regard to the groove direction.

The amorphous wire 44 serving as the magneto-sensitive element is embedded in an insulating epoxy resin 46 (shown in FIG. 3 but not shown in FIG. 5) filled in the inside of the recess 470 having the conductive patterns 45a and 45b formed on the side walls 470a and the bottom surface 470b. Conductive patterns 45c extending in a direction perpendicular to the groove direction are formed on the outer surface of the insulating resin 46 filled in the recess 470 such that each conductive pattern 45a on one side wall 470a is electrically connected to a conductive pattern 45a at a corresponding position on the opposing side wall 470a via one of conductive patterns 45c. The conductive patterns 45a, 45b, and 45c as a whole form a spiral electro-magnetic coil 45.

In the present example, the conductive patterns 45a and 45b are formed by depositing a conductive thin metal film (not shown in the figure) over the entire inner surfaces 470a and 470b of the recess 470 and then patterning the deposited thin metal film by means of etching. The conductive patterns 45c are formed by evaporating a conductive thin metal film (not shown in the figure) on the surface of the insulating resin 46 and then etching the conductive thin metal film.

The effective inner diameter of the electro-magnetic coil 45 is 66 μm corresponding to the inner diameter of a circle having the same area as the area of the cross section of the recess 470. The turn-to-turn distance of the electro-magnetic coil 45 is equal to 50 μm. The magnetic sensing parts 41 to 43 are all formed according to the same specifications, and they are disposed such that the longitudinal directions of amorphous wires 44 of magnetic sensing parts 41 to 43 are parallel to the X axis 10a, the Y axis 10b, and the Z axis 10c, respectively.

Figure 6:
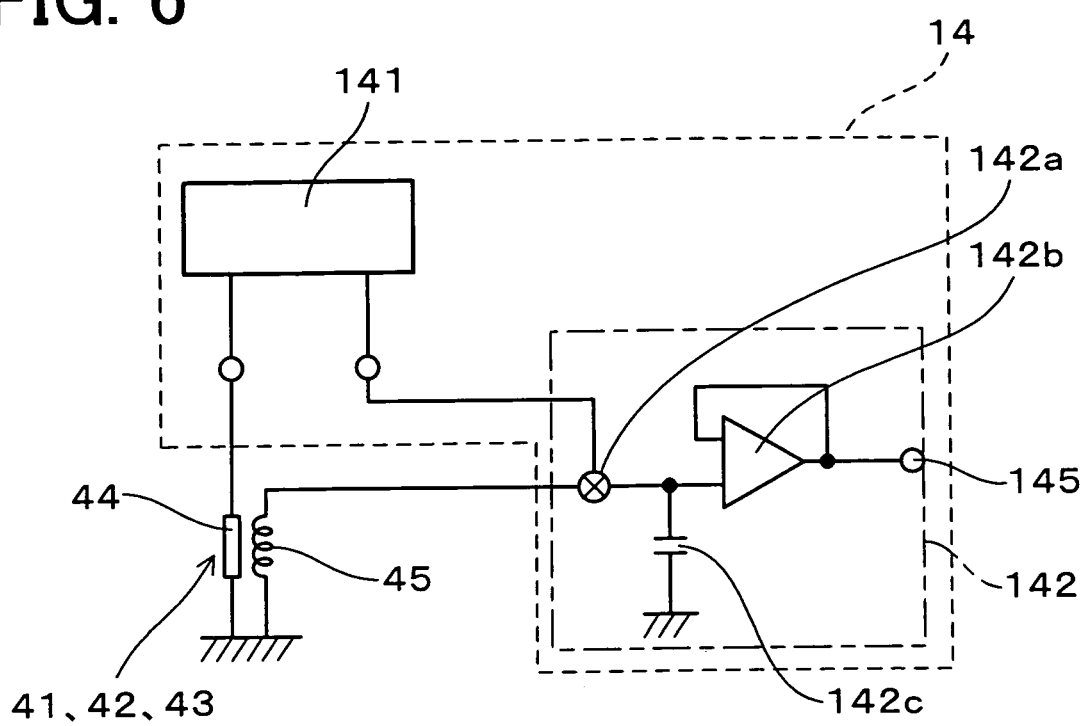
FIG. 6 is an equivalent circuit diagram showing an electronic circuit of an IC chip for use in a magnetic sensing part in Example 1.

The IC chip 14 for controlling the magnetic sensing parts 41 to 43 has an electronic circuit including, as shown in FIG. 6, a signal generator 141 that generates a pulse current input to the amorphous wire 44 and a signal processor 142 that outputs a measurement signal according to the induced voltage e (FIG. 7(b)) of the electro-magnetic coil 45. The signal generator 141 generates a pulse current with a width of 40 nsec at intervals of 5 μsec. The signal generator 141 of this example also outputs a trigger signal in synchronization with a falling edge of each pulse current to an analog switch 142a of the signal processor 141.

The signal processor 142 is composed of combination of a synchronous detector circuit which functions as a so-called "peak hold" circuit and an amplifier 142b. The synchronous detector circuit includes an analog switch 142a which turns on and off the electric connection between the electro-magnetic coil 45 and the signal processor 142 in synchronization with the trigger signal and also includes a capacitor 142c connected to the electro-magnetic coil 45 via the analog switch 142a.

Figure 7:
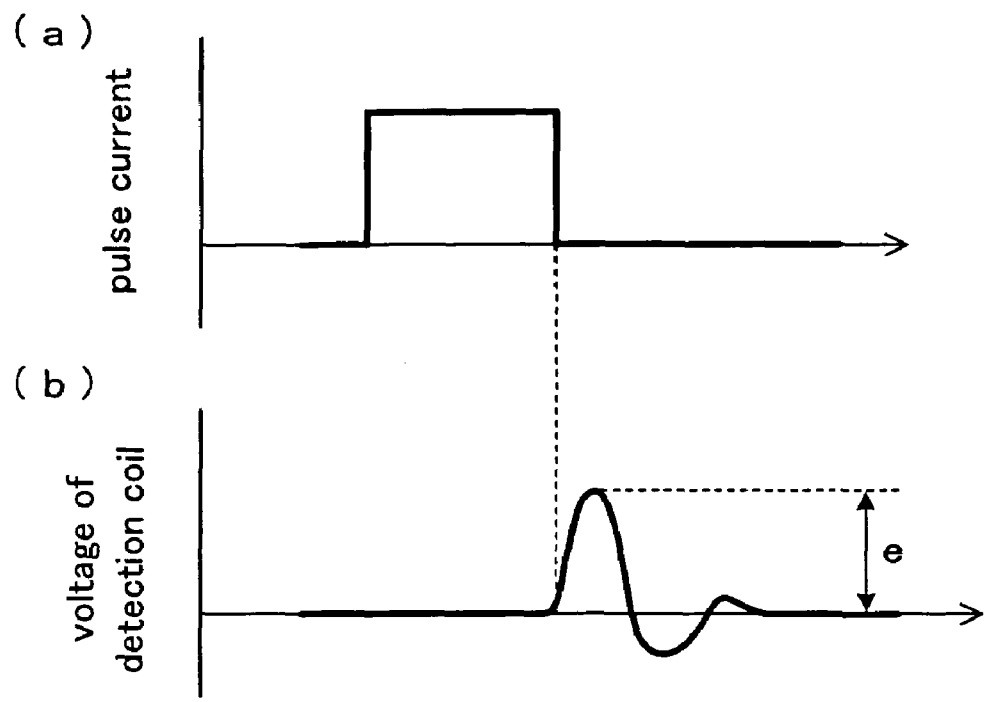
FIG. 7 is a graph showing the relationship between a pulse current passed through an amorphous wire and a voltage induced in an electro-magnetic coil in Example 1.

A method of detecting a magnetic field using the magnetic sensing parts 41 to 43 is briefly described below. In this magnetic field detection method, as shown in FIG. 7, when the pulse current passed through the amorphous wire 44 falls down (FIG. 7(a)), the induced voltage e (FIG. 7(b)) generated in the electro-magnetic coil 45 is measured. In the present example, the turn-off time, defined by a time needed for the pulse current to fall down from 90% of the steady-state value (150 mA) to 10% of the steady-state value, is set to be equal to 4 nsec.

That is, as shown in FIG. 7, at the moment when the pulse current flowing through the amorphous wire 44 placed into the magnetic field is turned off, an induced voltage e with a magnitude proportional to a magnetic field component in the longitudinal direction of the amorphous wire 44 is generated between the two ends of the electro-magnetic coil 45. In the IC chip 14 of this example, the induced voltage e between the electro-magnetic coil 45 is stored in the capacitor 142c via the analog switch 142a turned on by the trigger signal, is amplified by the amplifier 142b, and is output via an output terminal 145.

As described above, each of the magnetic sensing parts 41 to 43 outputs, via the IC chip 14, a signal corresponding to the intensity of the magnetic field component in the longitudinal direction of the amorphous wire 44.

Figure 8:
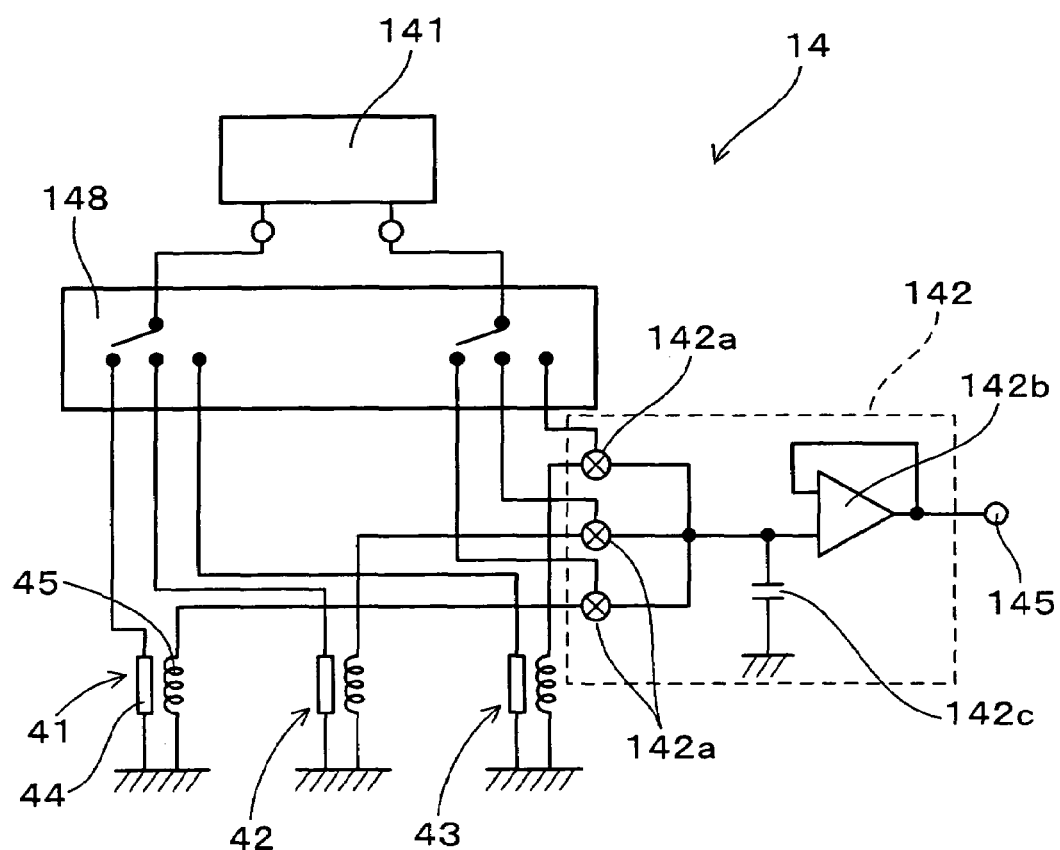
FIG. 8 is a circuit diagram showing an electronic circuit of an IC chip for use in a magnetic sensing part in Example 1.

The IC chip 14 for controlling the magnetic sensing parts has, as shown in FIG. 8, an electronic switch 148 for switching an electrical connection of the signal generator 141 to the magneto-sensitive elements 44 of the respective magnetic sensing parts 41 to 43 and also switching an electrical connection of the signal processor 142 to the electro-magnetic coils 45. Herewith, the three magnetic sensing parts 41 to 43 which measure the intensity of the magnetic field components along the X axis 10a, the Y axis 10b, and the Z axis 10c (FIG. 1) are switched one by one at intervals of 2 msec thereby allowing the IC chip 14 to be time-shared for the three magnetic sensing parts 41 to 43. The switching interval is not limited to 2 msec, and the switching interval may be longer or shorter than 2 msec.

Each of the tilt sensing parts 2a and 2b includes, as shown in FIG. 1, a cantilever 22 having a magnet body 21 disposed on the free end of the cantilever 22 and a magnetic detection head 23 which detects the strength of a magnetic field generated by the magnet body 21. In the tilt sensing parts 2a and 2b, the gravitational force applied to the cantilever 22 varies depending on the tilt angle, and thus the magnet body 21 disposed on the free end of each cantilever 22 is displaced depending on the tilt angle. A change in magnetic field strength caused by the displacement of the magnet body 21 is detected by the magnetic detection head 23.

Each cantilever 22 is made of an elastic material, and one end thereof in the longitudinal direction is supported by the supporting post 28 protruding from the surface of the substrate 10 in a direction perpendicular to the surface of the substrate 10. The magnet body 21 is disposed on the free end opposite to the end supported by the supporting post 28. The cantilever 22 is made of a NiP material in the form of a rectangular plate with a width of 0.3 mm, a length of 1.5 mm, and a thickness of 5 μm. Furthermore, in the present example, each cantilever 22 has an elongated hole 220 with a width of 0.22 mm extending from a position at which the cantilever 22 is connected to the supporting post 28 to a position 0.38 mm before the free end so that the hole 220 causes a reduction in stiffness against force in a thickness direction of the cantilever 22 and thus the magnet body 21 is displaced more widely.

In the present example, the elongated hole 220 causes the cantilever 22 to have a character frequency in the range from 50 Hz to 60 Hz. Although in the present example, the elongated hole 220 is formed on side of the cantilever, the cantilever may be used in the form of a flat plate having no hole.

The magnet body 21 is disposed on a side of the cantilever 22, at the free end of the cantilever 22. In the present example, the magnet body 21 is formed by coating a magnetic material on the side of the cantilever 22, drying and hardening the magnetic material, and finally magnetizing the magnetic material. In the present example, as shown in FIG. 9(a), a first magnet body 21a whose north pole is located on the outer side and a second magnet body 21b whose south pole is located on the outer side are disposed at positions adjacent in the longitudinal direction of the cantilever 22. That is, the first magnet body 21a and the second magnet body 21b are opposite in magnetization direction M and thus opposite in magnetic moment.

Thus, when the magnet body 21 is placed in a magnetic field, torques are applied to the first magnet body 21a and the second magnet body 21b in opposite directions. As a result, the magnet bodies 21a and 21b try to turn the cantilever 22 in opposite directions. Thus, as a whole of the magnet body 21, the torques caused by an ambient magnetic field are compensated, and displacement caused by the ambient magnetic field is suppressed. This minimizes an error in measured tilt angle caused by displacement of the magnet body 21 caused by an ambient magnetic field such as geomagnetism. Note that the magnet body 21 may be composed of only a single magnet.

In the above-described magnet body 21, as shown in FIG. 9(a), a magnetic field in the form of a closed loop is created as a composition of a magnetic field generated by the first magnet body 21a and a magnetic field generated by the second magnet body 21b. On the other hand, in a case in which only a single magnet body is disposed as shown in FIG. 9(b), the magnet body generates a magnetic field in the form of an open loop and the magnetic field is leaked surrounding, and thus it can cause electromagnetic noise and the like.

That is, in the tilt sensing parts 2a and 2b (FIG. 1) of the present example, the magnet body 21 is constructed in the form that minimizes the influence of leakage of the magnetic field on the surrounding, thereby preventing an ambient circuit from receiving electromagnetic noise. In the present example, each of the magnet bodies 21a and 21b has a width W (the size measured in the longitudinal direction of the cantilever 22) of 0.5 mm, a height of 0.3 mm, and a thickness T of 100 µm.

The magnetic detection head 23 of each of tilt sensing parts 2a and 2b may be disposed such that the magneto-sensitive element 24 is perpendicular to the magnetic field generated by the magnet body 21 or may be disposed such that the magneto-sensitive element 24 is parallel to the magnetic field generated by the magnet body 21. Alternatively, the magneto-sensitive element 24 may be disposed such that it is oriented in an arbitrary direction with respect to the magnetic field. However, in this case, the output value of the magnetic detection head 23 does not have a maximum or minimum value when the cantilever 22 is in its initial position, and thus it is required to shift the output value of the magnetic detection head 23.

The magnetic detection heads 23 (FIG. 1) of the respective tilt sensing parts 2a and 2b are formed according to the same specifications as those for the magnetic sensing parts 41 to 43. That is, in the present example, the high-sensitivity magnetic detection head 23 of each of the tilt sensing parts 2a and 2b is realized by a combination of the amorphous wire 24 (FIG. 10) serving as the magneto-sensitive element and the electro-magnetic coil 25 (FIG. 10), as with the magnetic sensing parts 41 to 43.

Figure 10:
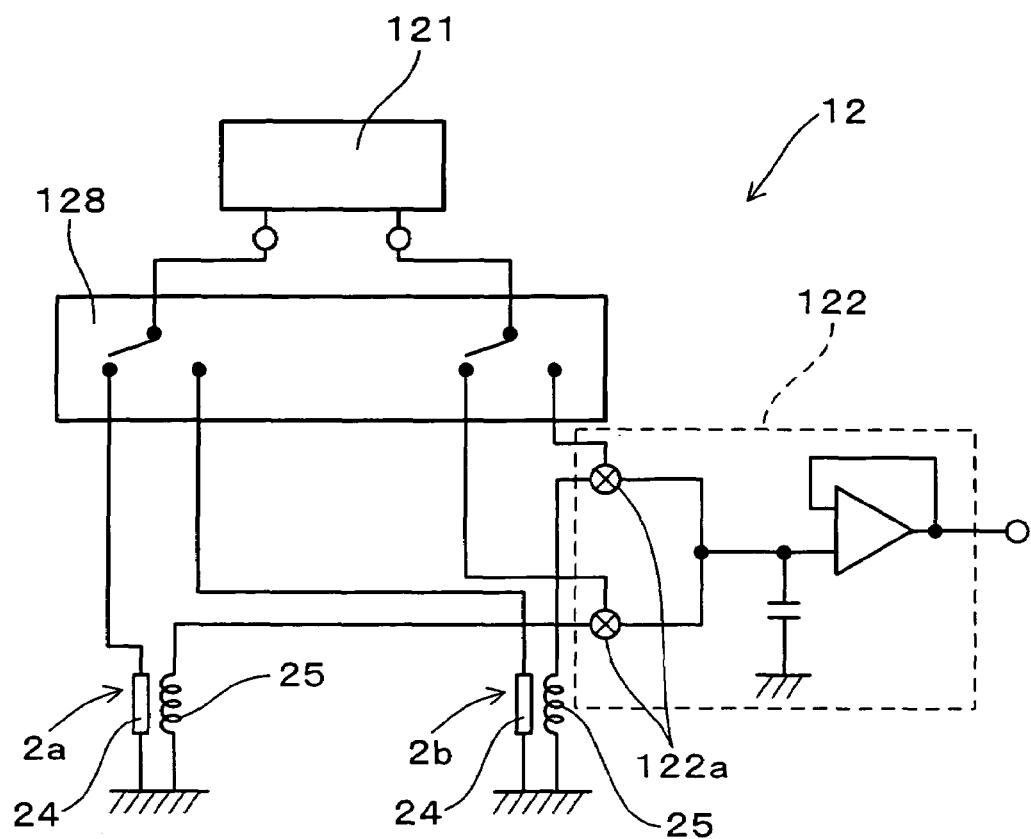
FIG. 10 is a circuit diagram showing an electronic circuit of an IC chip for use in a tilt sensing part in Example 1.

As shown in FIG. 10, the IC chip 12 for controlling the tilt sensing parts is basically similar to the IC chip 14 (FIG. 8) for controlling the magnetic sensing parts. That is, the IC chip 12 has an electronic circuit including, a signal generator 121 that generates a pulse current input to the amorphous wire 24 and a signal processor 122 that outputs a measurement signal according to the induced voltage generated in the electro-magnetic coil 25.

The IC chip 12 for controlling the tilt sensing parts has an electronic switch 128 for switching an electrical connection of the signal generator 121 to the magneto-sensitive elements 24 of the respective tilt sensing parts 2a and 2b and also switching an electrical connection of the signal processor 122 to the electro-magnetic coils 25. Two tilt sensing parts 2a and 2b are alternately switched at intervals of 2 msec thereby allowing the IC chip 12 to be time-shared for the two tilt sensing part 2a and 2b. The magnetic detection head 23 of each of the tilt sensing parts 2a and 2b detects a magnetic field in a similar manner to the magnetic sensing parts 41 to 43 described above, and thus a duplicated description thereof is omitted.

In the present example, as described above, the small-sized attitude detection sensor 1 is composed of the magnetic sensing parts 41 to 43 and the tilt sensing parts 2a and 2b, which are integrated in a single module.

The three magnetic sensing parts 41 to 43 and the two magnetic detection heads 23 are each formed using a magnetic detection element of the same type. This allows the electronic circuits to drive the magnetic detection elements according to the same principle.

Figure 11:
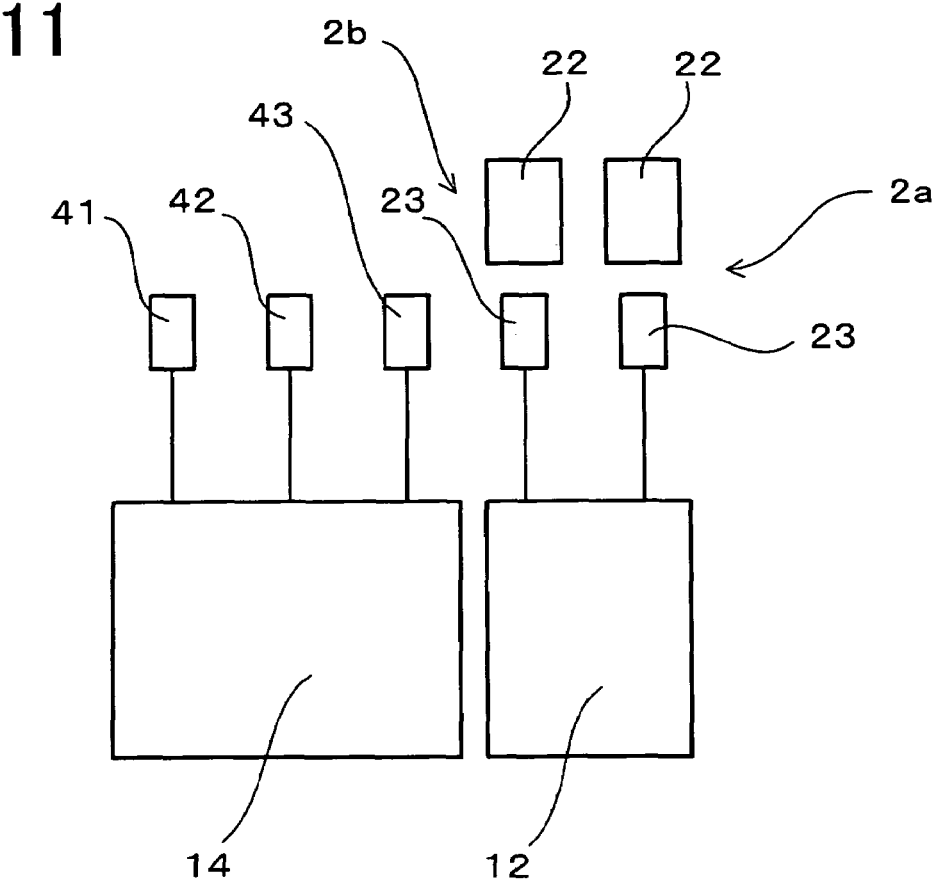
FIG. 11 is a block diagram showing a circuit configuration of Example 1 in which two electronic circuits are used to control five magnetic detection elements.
Figure 15:
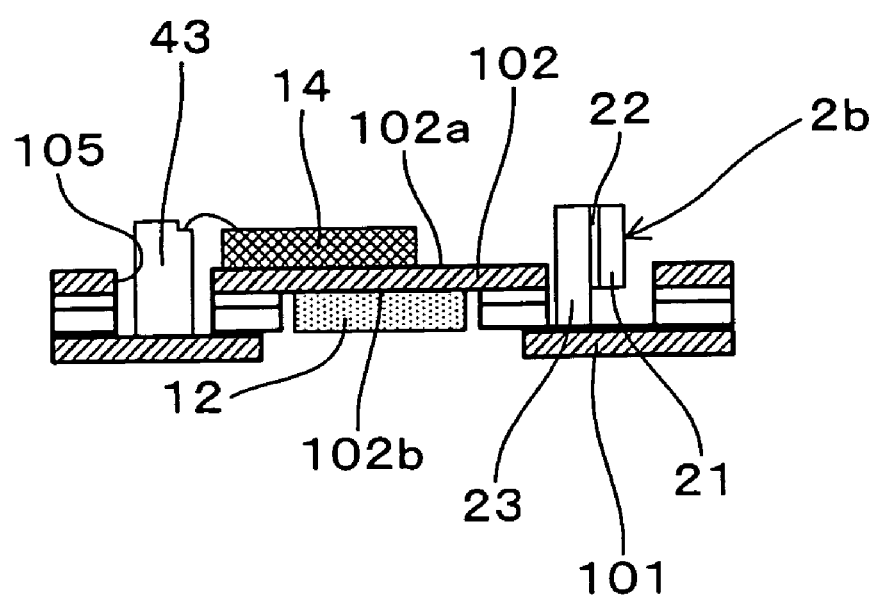
FIG. 15 is a cross-sectional view (taken along a line B-B of FIG. 14) showing a cross-sectional structure of a small-sized attitude detection sensor in Example 2.

In this small-sized attitude detection sensor 1, as shown in FIG. 11, the IC chip 14 serving as the control electronic circuit (FIG. 8) is shared by the three magnetic sensing parts 41 to 43, and the IC chip 12 serving as the control electronic circuit (FIG. 15) is shared by the two tilt sensing part 2a and 2b. Thus, the small-sized attitude detection sensor 1 has a small size and can operate with small power consumption.

In the tilt sensing parts 2a and 2b, the first magnet body 21a and the second magnet body 21b, which are opposite in the magnetization direction M (FIG. 9), are disposed at positions adjacent in the longitudinal direction of the cantilever 22. Thus, the magnet body 21 composed of the combination of the first and second magnet bodies 21a and 21b receives a very small a torque caused by an ambient magnetic field such as geomagnetism. This allows the small-sized attitude detection sensor 1 of the present example to detect a tilt angle with very high accuracy.

Furthermore, because the magnet body 21 is composed of the combination of the first and second magnet bodies 21a and 21b which are located at adjacent positions as described above, the magnetic field emanating from the magnet body 21 is in the form of a closed loop. Therefore, the small-sized attitude detection sensor 1 using the magnet body 21 generates very low electromagnetic wave noise, and thus the small-sized attitude detection sensor 1 can be mounted on an electronic board on which many other electronic parts are mounted at locations close to each, without exerting a significant influence on other electronic parts.

As described above, the magnetic sensing parts 41 to 43 and the magnetic detection heads 23 are formed according to the same specifications. Besides, the magnetic detection head 23 of the tilt sensing part 2a and the magnetic sensing part 42 are placed such that the amorphous wires 44 thereof extend in the same direction, and the magnetic sensing part 41 and the magnetic detection head 23 of the tilt sensing part 2b are placed such that the amorphous wires 44 thereof extend in the same direction.

More specifically, the two magnetic sensing parts 41 and 42 are disposed so as to be in parallel with the magnetic detection heads 23 of the two respective tilt sensing parts 2b and 2a.

The voltage induced by an ambient magnetic field such as geomagnetism in the electro-magnetic coil 25 wound around the amorphous wire 24 of one of magnetic detection heads 23 is equal to the voltage induced by the ambient magnetic field in the electro-magnetic coil 45 wound around the amorphous wire 44 of one of magnetic sensing parts 41 to 43, when the amorphous wires 44 extend in the same longitudinal direction.

Thus, when the correction in which the signal output of the magnetic sensing part 42 subtracted from the signal output of the magnetic detection head 23 of the tilt sensing part 2a is conducted, the influence by the ambient magnetic field is excluded from the signal output of the tilt sensing part 2a, and thus the detection accuracy is improved.

More specifically, the signal Hs output from the magnetic detection head 23 of the tilt sensing part 2a is given by the sum of the quantity of magnetism $k_1H_\theta$ corresponding to the amount of tilt and a component He of geomagnetism in the Y direction (same as the direction in which the magnetic detection head 23 has sensitivity). That is, the signal Hs can be expressed as follows.

$$Hs = k_1H_\theta + k_2He \quad (1)$$

The signal H's output from the magnetic sensing part 42 with the same direction as that of the above magnetic detection head 23 can be expressed as follows.

$$H's = k_3He \quad (2)$$

When $k_2 = k_3$, if H's given by equation (2) is subtracted from Hs given by equation (1), then the result is $$Hs - H's = k_1H_\theta \quad (3)$$

Thus, a noise component caused by the geomagnetism is removed.

In equations (1) to (3), $k_1$, $k_2$, and $k_3$ are coefficients associated with quantity of magnetism.

The signal output from the tilt sensing part 2b can also be corrected in a similar manner.

In the present example, as described above, the specifications are the same for the magnetic detection heads 23 and the magnetic sensing parts 41 to 43, and the electronic circuit of the IC chip 14 for use with the magnetic sensing parts is basically similar to the electronic circuit of the IC chip 12 for use with the tilt sensing parts. Therefore, a single control circuit may be used to control all magnetic sensing parts 41 to 43 and tilt sensing parts 2a and 2b by time-sharing the single control circuit at intervals of 2 msec.

Figure 12:
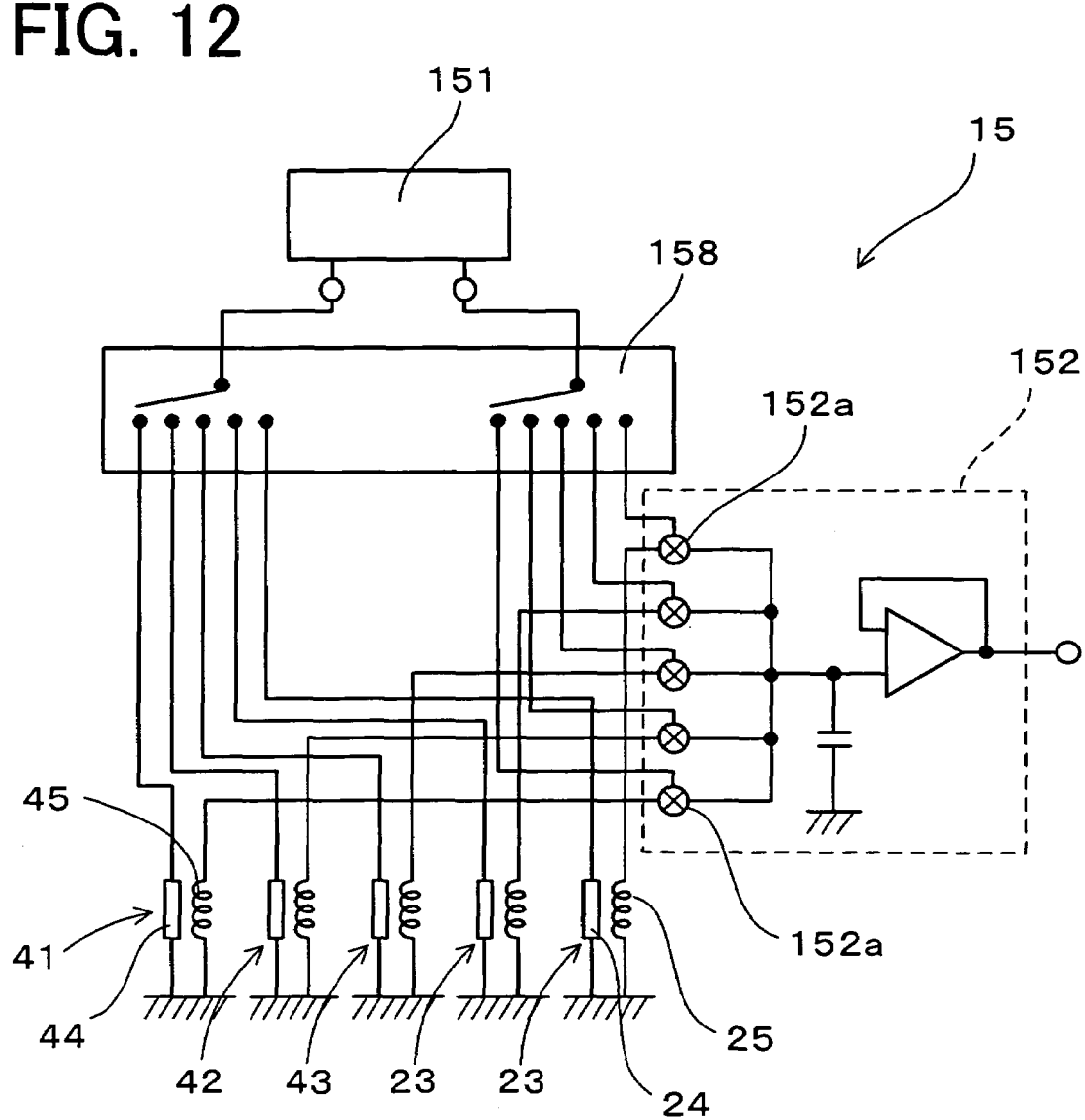
FIG. 12 is a circuit diagram showing an electronic circuit in the form of an IC chip of Example 1 in which the electronic circuit is shared by a magnetic sensing part and a tilt sensing part.
Figure 13:
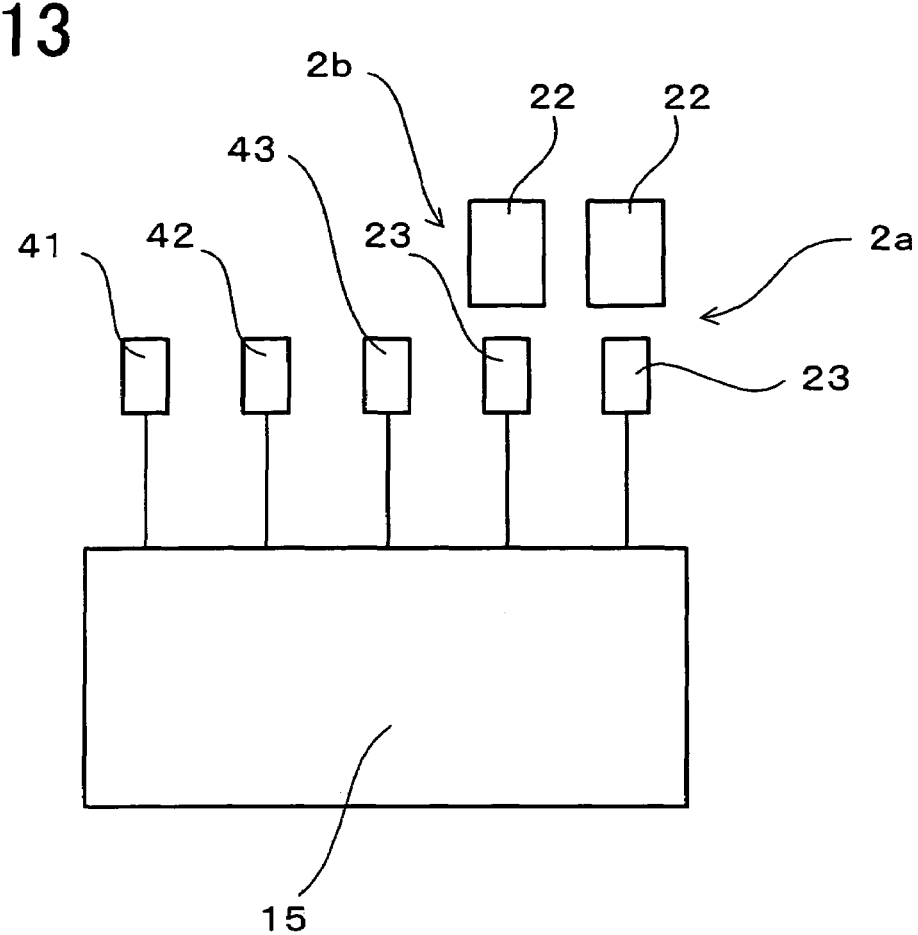
FIG. 13 is a block diagram showing a circuit configuration of Example 1 in which one electronic circuit is used to control five magnetic detection elements.

More specifically, as shown in FIGS. 12 and 13, by time-sharing the single IC chip 15 serving as the electronic circuit including a 5-channel change-over switching unit (electronic switching unit 158), it is possible to control the five magnetic detection elements, that is, the three magnetic sensing parts 41 to 43 and the two magnetic detection heads 23.

In this configuration, the single electronic circuit is shared by the three magnetic sensing parts 41 to 43 and the magnetic detection heads 23 of the two tilt sensing parts 2a and 2b, and thus a further reduction in the total size of the attitude detection sensor 1 can be easily achieved, and a reduction in power consumption is also achieved.

If connection parts for the connection between the magnetic detection elements and the main part of the electronic circuit are not taken into the count, the electronic circuit includes a driver circuit for driving the magnetic detection elements, a signal detection circuit, a signal processing circuit, a signal transfer circuit, and a sensor power supply circuit. Instead of disposing electronic circuits separately for the respective five magnetic detection elements, it is possible to dispose only one electronic circuit that is switched via the electronic switching unit 158 such that the electronic circuit for controlling the magnetic detection elements is shared by the five magnetic detection elements. This allows a great reduction in the size of the electronic circuit, and thus a reduction in the total size of the small-sized attitude detection sensor 1.

As described above, use of the single electronic circuit including the 5-channel change-over switching unit to control the five magnetic detection elements allows a reduction in the size of the small-sized attitude detection sensor 1. Note that a reduction in the size of the small-sized attitude detection sensor 1 is also achieved when two electronic circuits are used to control the five magnetic detection elements.

As described above, when MI elements are used as the magnetic detection elements as in the present example, use of the change-over switching unit (electronic switching unit 128, 148, or 158) is very effective. That is, because the MI elements are excellent in output linearity and response, it is possible to achieve a good operation when the connection between an MI element and the electronic circuit is switched using the change-over switching unit.

Note that in FIGS. 10 and 12, reference numerals 122 and 152 denote signal processing units, and reference numerals 122a and 152a denote analog switches.

Example 2

Figure 14:
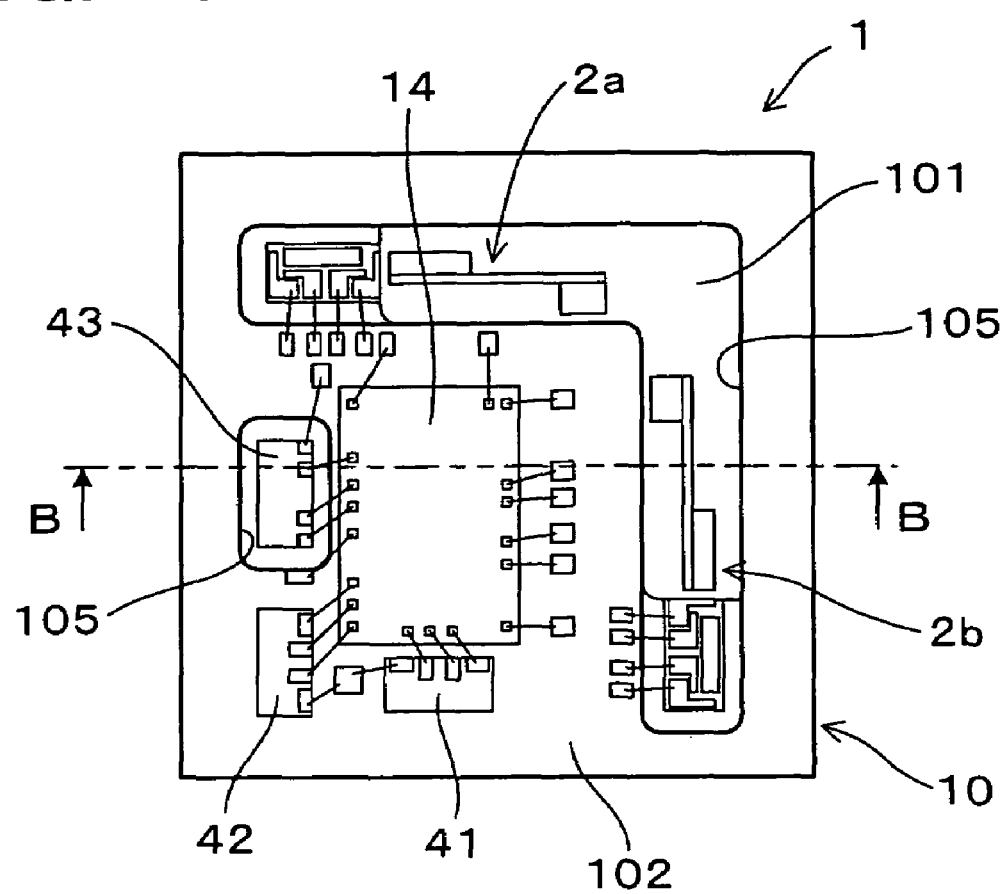
FIG. 14 is a top view of a small-sized attitude detection sensor in Example 2.

In Example 2, the small-sized attitude detection sensor of Example 1 is modified such that the substrate is composed of two substrates. The details of the small-sized attitude detection sensor in Example 2 are described below with reference to FIGS. 14 and 15.

In the present example, the substrate 10 includes a first substrate 101 and a second substrate 102. Of three magnetic sensing parts 41 to 43, at least a vertical magnetic sensing part 43 for detecting the magnetic field strength in the vertical direction (the Z direction denoted by an arrow 10C in FIG. 1) to the substrate 10 is disposed on the first substrate 101. The second substrate 102 is held on the first substrate 101. The vertical magnetic sensing part 43 is disposed on a surface, which faces the second substrate 102, of the first substrate 101, in an area which is not in contact with the second substrate 102. Furthermore, in the small-sized attitude detection sensor 1 of the present example, the tilt sensing parts 2a and 2b, which are greater in height than the magnetic sensing parts 41 and 42 and the IC chips 12 and 14, are also disposed on the surface, which faces the second substrate 102, of the first substrate 101, in the area which is not in contact with the second substrate 102.

In the present example, the second substrate 102 is a double-sided substrate having two through-holes 105. On a first mounting surface 102a, which faces the first substrate 101, of the second substrate 102, two magnetic sensing parts 41 and 42 are mounted, which detect the strength of a magnetic field in respective directions along two axes parallel to the first mounting surface 102a and perpendicular to each other, and the IC chip 12 is also mounted, which controls the magnetic sensing parts 41 to 43. The IC chip 12 for controlling the tilt sensing parts 2a and 2b are mounted on a second mounting face 102b, opposite to the first mounting surface 102a, of the second substrate 102.

As described above, in the small-sized attitude detection sensor 1 of the present example, the substrate 10 has a two-level structure including the first substrate 101 and the second substrate 102, and parts with large heights (such as the vertical magnetic sensing part 43 and the tilt sensing parts 2a and 2b) are disposed in the area where there is no overlap in the vertical direction between the substrates 101 and 102. Thus, the small-sized attitude detection sensor 1 of the present example is constructed in the form of a module in which parts are disposed very densely.

The small-sized attitude detection sensor 1 of to the present example is similar to the small-sized attitude detection sensor 1 in Example 1, in terms of the structure, the operation, and the advantages, except for the difference described above.

Example 3

Figure 16:
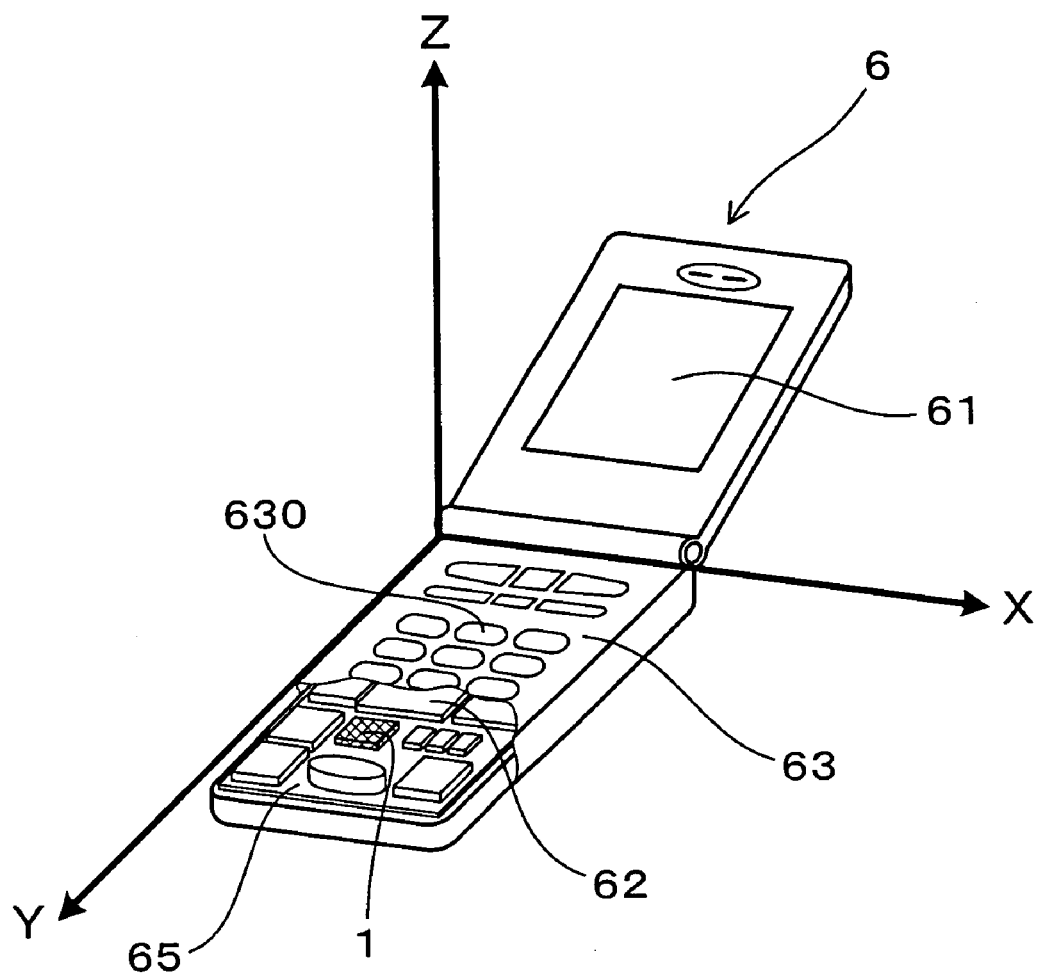
FIG. 16 is a partially cutaway perspective view of a portable telephone in Example 3.
Figure 17:
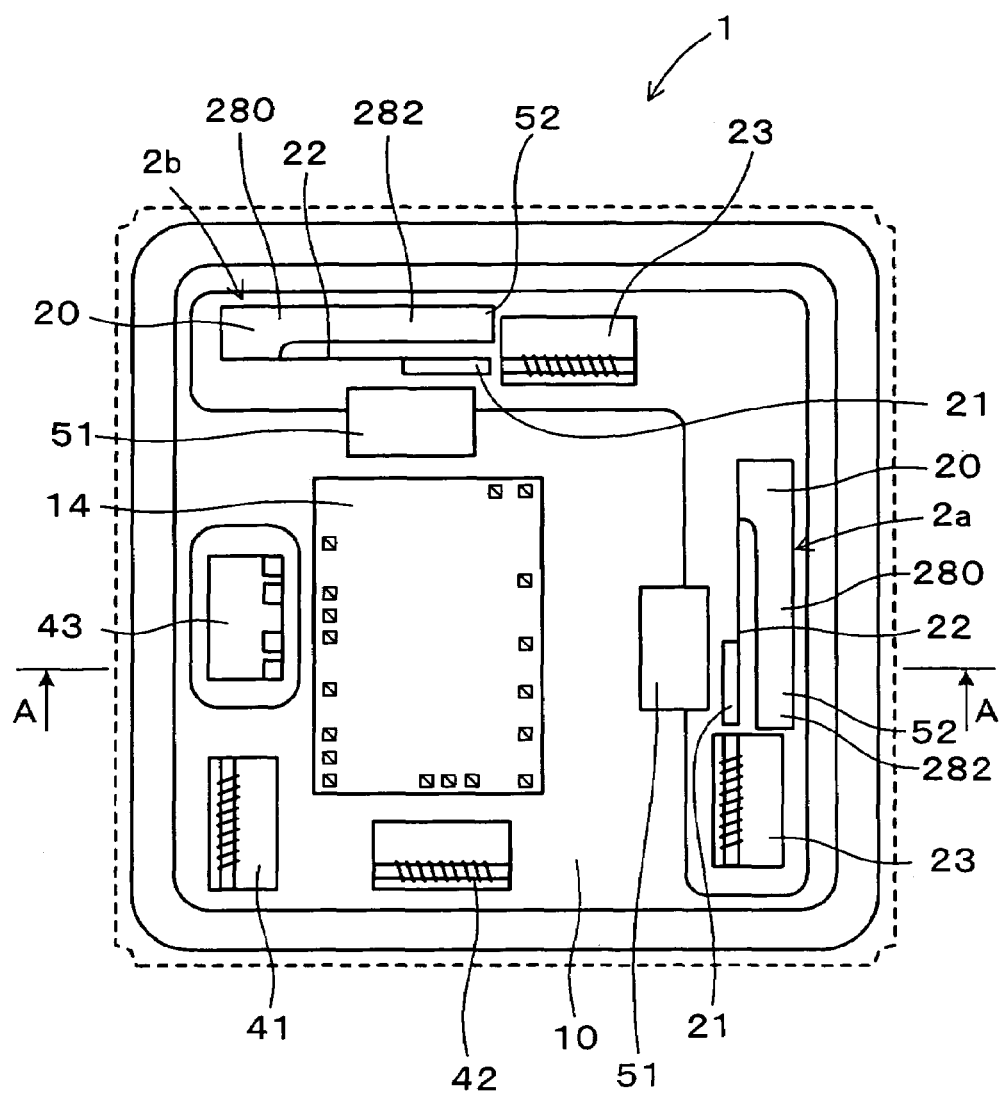
FIG. 17 is a plan view of a small-sized attitude detection sensor in Example 4.
Figure 18:
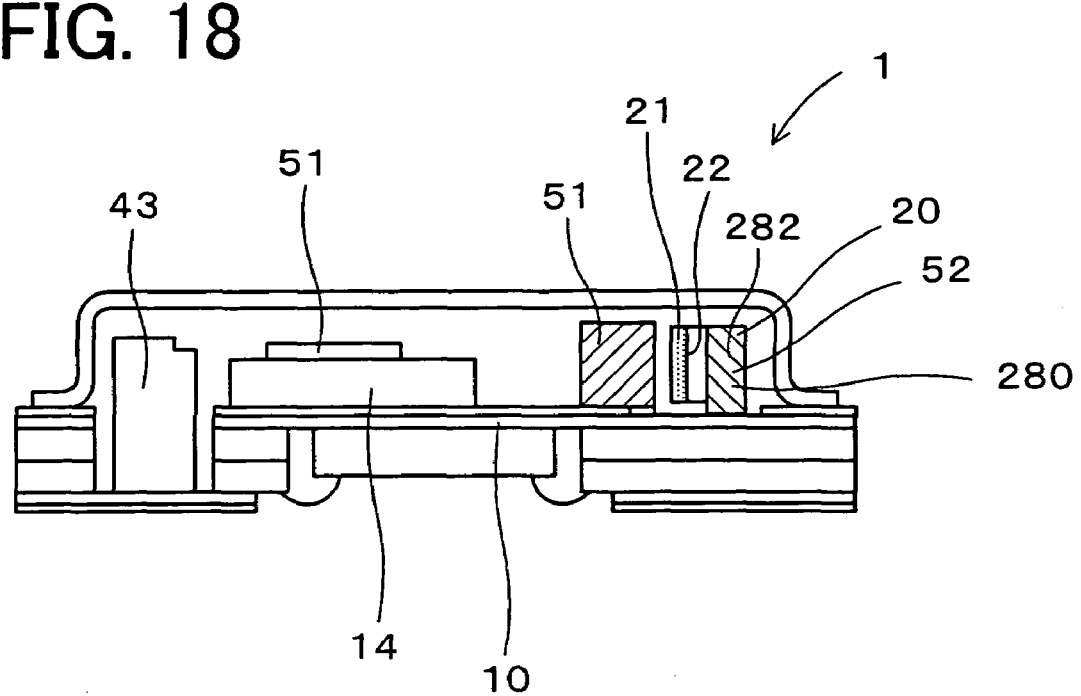
FIG. 18 is a cross-sectional view taken along a line A-A of FIG. 17.

In Example 3, the invention is applied to a portable telephone using a small-sized attitude detection sensor in Example 1 or Example 2. The details of Example 3 are described below with reference to FIG. 16.

A portable telephone 6 is designed to perform two-way voice communication by means of radio transmission. The portable telephone 6 includes a small-sized attitude detection sensor 1, one-chip microcomputer 62 including a CPU (Central Processing Unit), and a memory element (not shown in the figure) in which an operation program is stored, wherein the small-sized attitude detection sensor 1, the one-chip microcomputer 62, and the memory element are mounted on an internal substrate 65. The small-sized attitude detection sensor 1 detects rotation angles around an X axis, a Y axis, and a Z axis, respectively, which are defined on the portable telephone 6, that is, a rolling angle, a pitch angle, and a yaw angle. The detected rotation angles are output to the microcomputer 62. In the present example, the attitude detection sensor 1 has a very small size. More specifically, for example, the small-sized attitude detection sensor 1 has a width of 5.5 mm, a depth of 5.5 mm, and a height of 1.5 mm.

The portable telephone 6 is capable of serving as an Internet browser, which allows various kinds of information received via the Internet to be displayed on a liquid crystal display screen 61. If the portable telephone 6 is tilted, the content displayed on the liquid crystal display screen 61 is scrolled in a tilted direction. More specifically, in accordance with the operation program stored in the memory element, the microcomputer 62 calculates the amount of scrolling to be performed on the content displayed on the liquid crystal display screen 61 depending on the attitude information output from the small-sized attitude detection sensor 1.

Thus, according to the portable telephone 6 of the present example, the attitude-sensitive operation assists the operation using operation buttons 630 disposed on an operation control panel 63. This allows a user to easily operate the portable telephone 6.

The present example is similar to Example 1 or Example 2, in terms of the structure, the operation, and the advantages, except for the difference described above.

Example 4

In Example 4, as shown in FIGS. 17 to 22, a small-sized attitude detection sensor 1 includes stoppers 51 and 52 that are disposed on both sides of the rotational direction of a cantilever 22 to prevent over displacement of the free end 222 of the cantilever 22.

In the present example, a supporting post 280 which supports the fixed end 221 of the cantilever 22 is formed in the shape of L in cross section.

Figure 21:
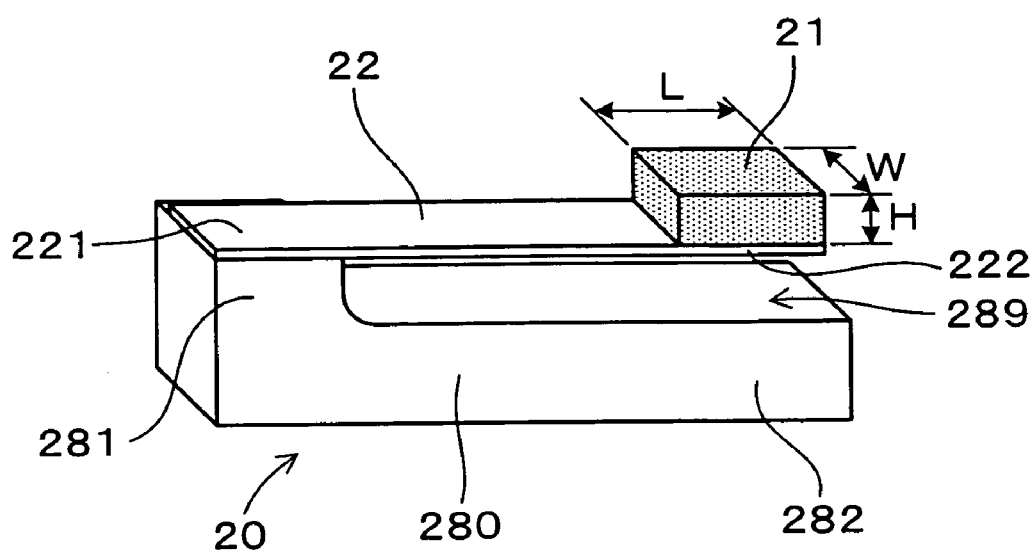
FIG. 21 is a perspective view of a tilt sensing part in Example 4.
Figure 22:
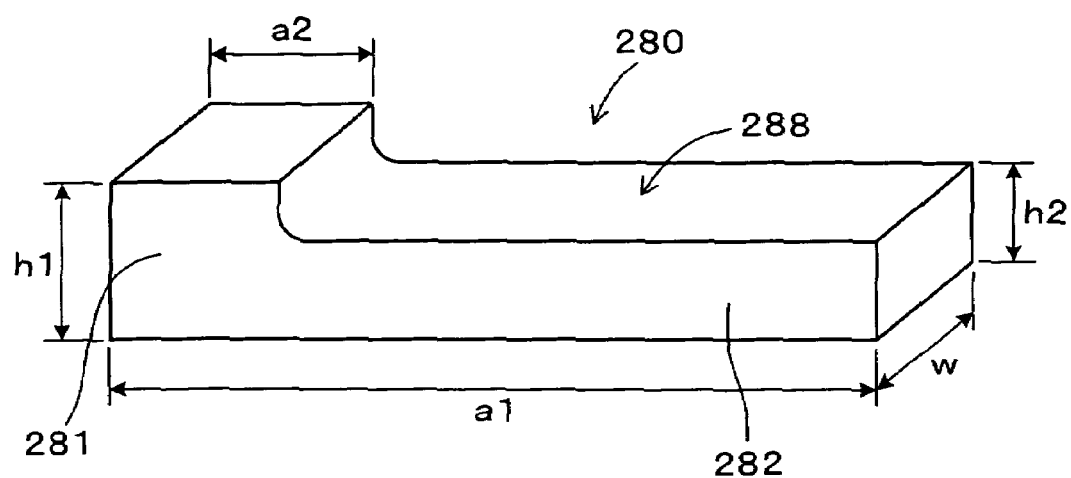
FIG. 22 is a perspective view of a supporting part in Example 4.

That is, as shown in FIGS. 21 and 22, the supporting post 280 has a base part 281 connected to the fixed end 221 and an extension part 282. A gap 289 is formed between the extension part 282 and the cantilever 22, while the extension part 282 is extending from the base part 281 toward the free end 222 of the cantilever 22. A magnet body 21 is attached to the free end 222 of the cantilever 22, on a side opposite to the gap 289.

The combination of the supporting post 280, the cantilever 22, and the magnet body 21 forms a tilt sensing part 20.

The size of the supporting post 280 is set, for example, such that the width w is equal to 0.6 mm and the length a1 is equal to 2.0 mm. The size of the base part 281 is set, for example, such that the height h1 is equal to 0.4 mm and the length a2 is equal to 0.4 mm. The height h2 of the extension part 282 is set, for example, to 0.3 mm.

The size of the magnet body 21 is set, for example, such that the length L is equal to 0.2 to 0.6 mm, the width W is equal to 0.2 to 0.8 mm, and the height H is equal to 0.05 to 0.2 mm. Note that the length is measured in a direction from the fixed end 221 to the free end 222 of the cantilever 22, the width W is measured in a direction perpendicular to the direction of the length L and parallel to the surface of the cantilever 22, and the height H is measured in a direction perpendicular to the surface of the cantilever 22.

Of the two stoppers 51 and 52, the stopper 52 is integrated with the supporting post 280. That is, the extension part 282 of the supporting post 280 serves as the stopper 52.

Separately from the supporting post 280, the stopper 51 is fixed to the substrate 10 at a position on a side, opposite to the side where the stopper 52 is located intervening the free end 222 between, of the cantilever 22.

Figure 19:
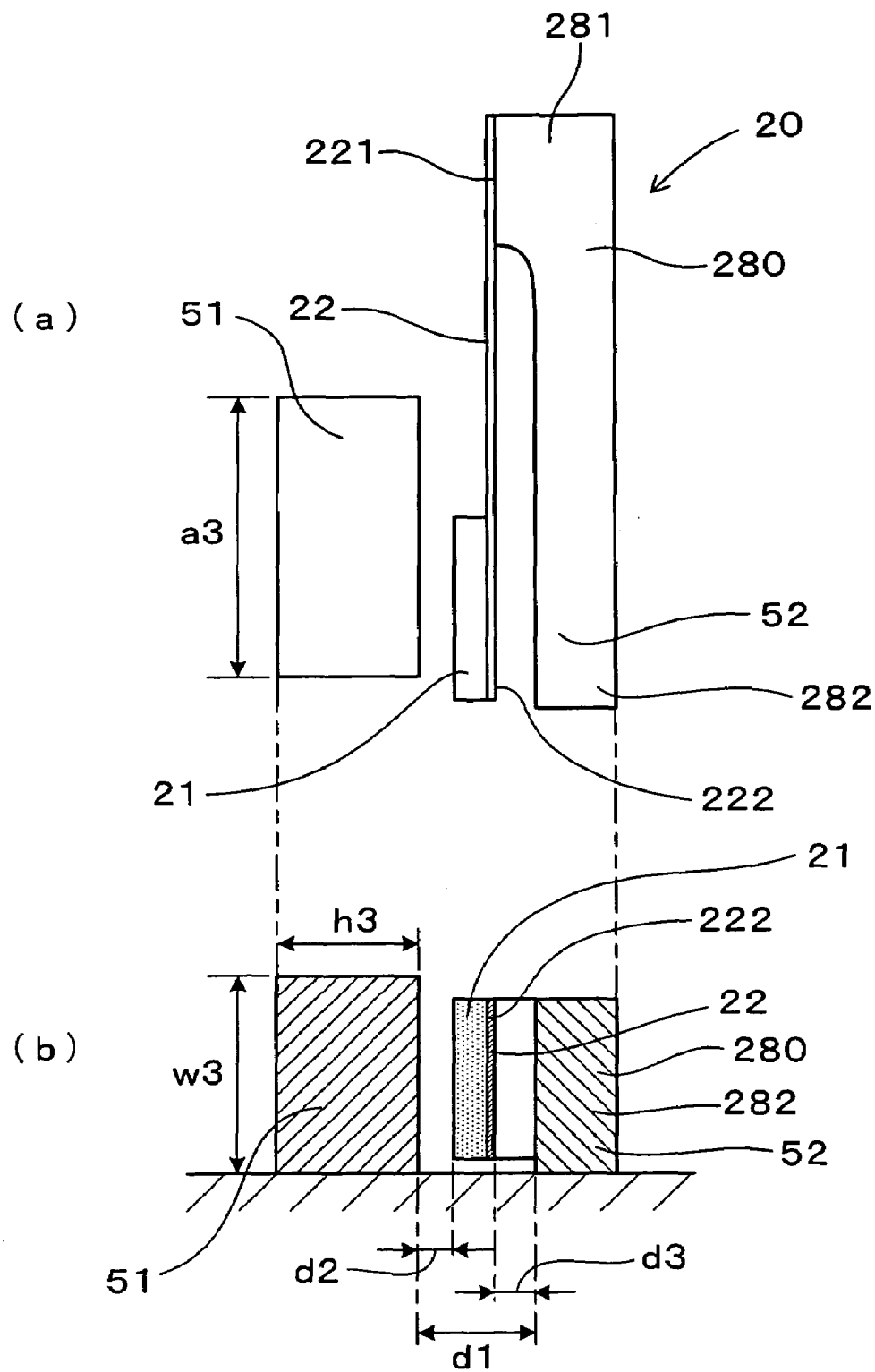
FIG. 19 shows a plan view and a cross-sectional view of a tilt sensing part and a stopper in Example 4.

More specifically, in the tilt sensing part 20, the stopper 51 is located on the side of the free end 222 of the cantilever 22. As shown in FIG. 19, the stopper 51 is spaced from the extension part 282 (the stopper 52) of the tilt sensing part 20 by a distance d1 of, for example, 0.4 mm.

The space d2 between the stopper 51 and the magnet body 21 disposed on the free end 222 of the cantilever 22 is set to, for example, 0.18 mm. The space d3 between the free end 222 of the cantilever 22 and the stopper 52 (the extension part 282) is set to, for example, 0.08 mm.

Preferably, the length W3 of the stopper 51 measured in the direction perpendicular to the surface of the substrate 10 is set to be nearly equal to the height of the supporting post 280. More specifically, for example, the length W3 of the stopper 51 is set to 0.55 mm. The length h3 of the stopper 51 in a direction perpendicular to the cantilever 22 is set to 0.5 mm, and the length a3 parallel to the cantilever 22 is set to 0.9 mm.

The stopper 51 and the supporting post 280 are made of Si (silicon), and the cantilever 22 is made of a Ni—P alloy.

The small-sized attitude detection sensor 1 of the present example is similar to the small-sized attitude detection sensor 1 in Example 1 except for the difference described above.

Figure 20:
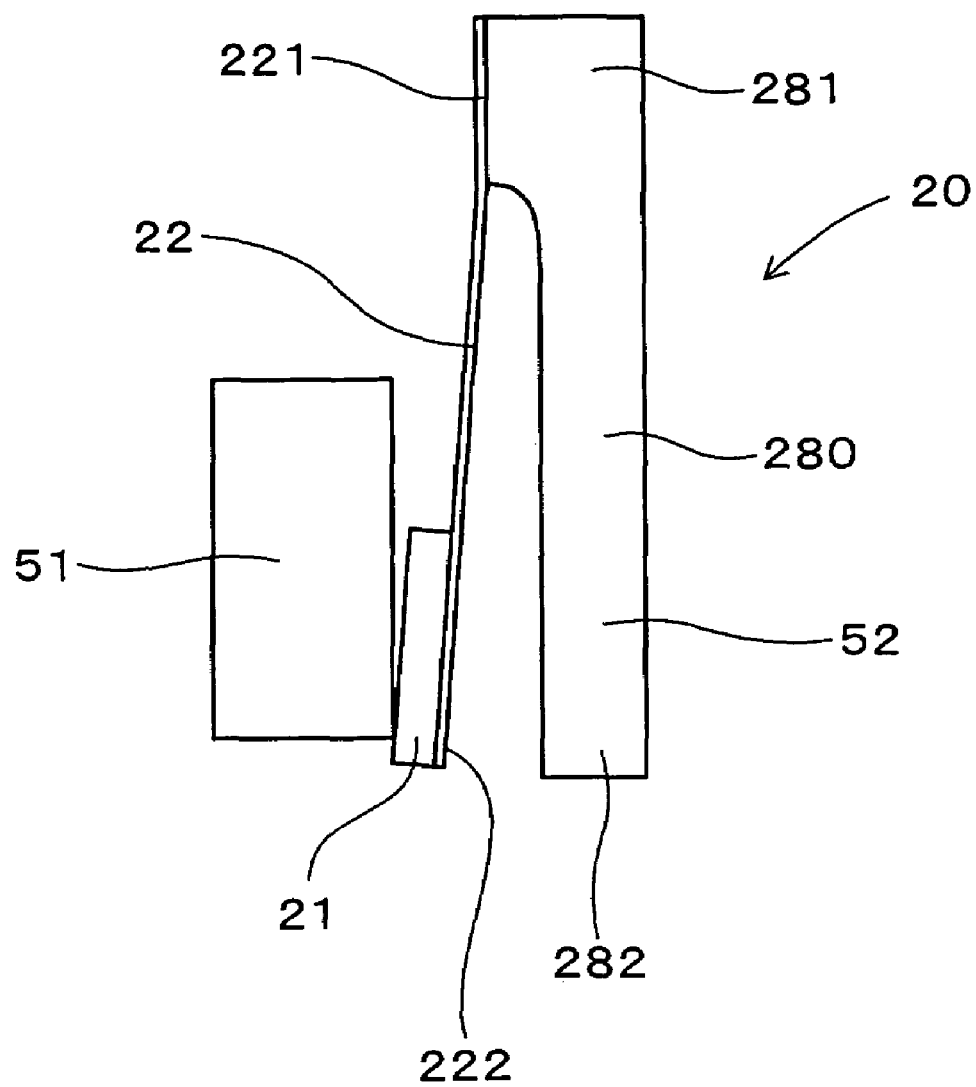
FIG. 20 is a plan view showing a function of a stopper in a tilt sensing part in Example 4.

In the small-sized attitude detection sensor 1 of the present example, even if a large force is applied to the cantilever when a large shock is applied to the small-sized attitude detection sensor 1, the free end 222 of the cantilever 22 is brought into contact with the topper 51 (or the stopper 52) as shown in FIG. 20 and thus over displacement is prevented. This prevents the cantilever 22 from being deformed or damaged.

Because one of the stopper 52 is integrated with the supporting post 280, the small-sized attitude detection sensor 1 can be produced easily with a less number of parts at a lower cost.

Because the supporting part 280 is composed of the base part 281 and the extension part 282, the supporting part 280 fixed to the cantilever 22 (the tilt sensing part 20) can be easily handled when it is mounted on the substrate 10.

When the tilt sensing part 20 is handled, it is preferable to hold a part other than the cantilever 22, that is the supporting part 280, to prevent the cantilever 22 from being deformed. Forming of the supporting part 280 so as to have the above-described shape makes it possible to easily hold the supporting part 280. This makes it possible to easily handle the tilt sensing part 20.

By setting the length a1 of the supporting post 280 to be slightly longer than the length of the cantilever 22 (for example, by 0.1 mm), it becomes easier to hold the supporting part 280 at the two ends thereof in the longitudinal direction without touching the cantilever 22.

In addition to the advantages described above, the present invention also provides advantages similar to those obtained in Example 1.

The invention claimed is:

1. An attitude detection sensor comprising:

three magnetic sensing parts that detect magnetic field strength in respective directions along three axes perpendicular to each other; and two tilt sensing parts that detect tilt angles around two axes perpendicular to each other;

wherein each tilt sensing part includes a cantilever having a magnet body that moves in accordance with the tilt angle, and a magnetic detection head that detects a displacement of the magnet body, the three magnetic sensing parts and the two magnetic detection heads are each formed using a magnetic detection element of a same type, and at least one electronic circuit for controlling the five magnetic detection elements, the three magnetic sensing parts, and the two tilt sensing parts are disposed in a single package in a form of a module.

2. An attitude detection sensor according to claim 1, wherein the magnetic detection elements used to form the three respective magnetic sensing parts and the magnetic detection elements used to form the two respective magnetic detection heads are each formed using a magneto-impedance sensor element.

3. An attitude detection sensor according to claim 1, wherein each cantilever is in a form of a strip beam, a first end of which is fixed to a substrate of the package via a supporting post, and the magnet body is disposed on a second end of which the cantilever is rotatable in a direction normal to a main plane of the cantilever, and the cantilever is disposed such that the direction of the rotation is parallel with the surface of the substrate.

4. An attitude detection sensor according to claim 1, wherein two electronic circuits each having a change-over switch are used in a time-sharing manner to control the five magnetic detection elements.

5. An attitude detection sensor according to claim 1, wherein an electronic circuit having a change-over switch is used in a time-sharing manner to control the five magnetic detection elements.

6. An attitude detection sensor according to claim 1, wherein the attitude detection sensor has a function of making a correction by subtracting the value of a magnetic field measured by a magnetic sensing part disposed in parallel with the magnetic detection head of each tilt sensing part from the value of a magnetic field measured by the magnetic detection head of each tilt sensing part.

7. An attitude detection sensor according to claim 1, wherein the attitude detection sensor is in a form of a surface-mounting chip with a width equal to or less than 6 mm, a depth equal to or less than 6 mm, and a height equal to or less than 2 mm.

8. A portable telephone comprising an attitude detection sensor according to claim 1, a central processing unit, and a memory element for storing an operation program, wherein the central processing unit is configured to download a signal output from each magnetic detection sensor and performs a predetermined operation in accordance with the operation program.

* * * * *